(12) United States Patent
Erlich et al.

(10) Patent No.: US 9,734,720 B2
(45) Date of Patent: Aug. 15, 2017

(54) RESPONSE MODE VERIFICATION IN VEHICLE DISPATCH

(71) Applicant: ZOLL MEDICAL CORPORATION, Chelmsford, MA (US)

(72) Inventors: Michael S. Erlich, Erie, CO (US); Ryan Schwerman, Wheat Ridge, CO (US)

(73) Assignee: ZOLL Medical Corporation, Chelmsford, MA (US)

( * ) Notice: Subject to any disclaimer, the term of this patent is extended or adjusted under 35 U.S.C. 154(b) by 0 days.

(21) Appl. No.: 15/086,900

(22) Filed: Mar. 31, 2016

(65) Prior Publication Data

US 2016/0293011 A1    Oct. 6, 2016

Related U.S. Application Data

(60) Provisional application No. 62/141,786, filed on Apr. 1, 2015.

(51) Int. Cl.
*G08G 1/123* (2006.01)
*G08G 1/00* (2006.01)
(Continued)

(52) U.S. Cl.
CPC ............. *G08G 1/20* (2013.01); *H04L 51/38* (2013.01); *H04L 67/12* (2013.01)

(58) Field of Classification Search
CPC .......... G08G 1/20; G01C 21/10; H04L 51/38; H04L 67/12
(Continued)

(56) References Cited

U.S. PATENT DOCUMENTS 4,649,930 A    3/1987    Groch et al.
4,945,759 A    8/1990    Krofchalk et al.
(Continued)

FOREIGN PATENT DOCUMENTS

EP    1538025 A1    6/2005
JP    08-126616 A    5/1996
(Continued)

OTHER PUBLICATIONS

Chu, Yuechun et al., "A Mobile Teletrauma System Using 3G Networks," IEEE Transactions on Information Technology in Biomedicine, vol. 9, No. 4, Dec. 2004, 456-462.
(Continued)

*Primary Examiner* — Toan N Pham
(74) *Attorney, Agent, or Firm* — Wilmer Cutler Pickering Hale and Dorr LLP

(57) ABSTRACT

A system for response mode verification according to an embodiment of the present disclosure may include a user interface device; a vehicle motion sensor located in a vehicle; a memory; and/or a processor communicably coupled to the user interface device, the vehicle motion sensor, and the memory, the memory including instructions that, when executed by the processor, cause the processor to: receive a dispatch request, receive a first indication from the user interface device based on a user indicating acceptance of the dispatch request, record an acceptance time of the first indication, receive a second indication from the vehicle motion sensor based on the vehicle motion sensor monitoring a change in movement of the vehicle, and record a vehicle motion time of the second indication, generate a notification indicating that a difference between the vehicle motion time and the acceptance time exceeds a threshold time.

27 Claims, 8 Drawing Sheets

(51) Int. Cl.
*H04L 12/58* (2006.01)
*H04L 29/08* (2006.01)

(58) Field of Classification Search
USPC .... 340/989, 992, 539.13, 6.1, 293, 502, 503
See application file for complete search history.

(56) References Cited

U.S. PATENT DOCUMENTS

| | | |
|---|---|---|
| 5,085,224 A | 2/1992 | Galen et al. |
| 5,208,754 A | 5/1993 | Nakaura et al. |
| 5,224,485 A | 7/1993 | Powers et al. |
| 5,319,363 A | 6/1994 | Welch et al. |
| 5,333,617 A | 8/1994 | Hafner |
| 5,343,869 A | 9/1994 | Pross et al. |
| 5,483,452 A | 1/1996 | Tanaka |
| 5,494,051 A | 2/1996 | Schneider, Sr. |
| 5,511,553 A | 4/1996 | Segalowitz |
| 5,531,472 A | 7/1996 | Semchena et al. |
| 5,544,661 A | 8/1996 | Davis et al. |
| 5,549,659 A | 8/1996 | Johansen et al. |
| 5,570,127 A | 10/1996 | Schmidt |
| 5,574,443 A | 11/1996 | Hsieh |
| 5,593,426 A | 1/1997 | Morgan et al. |
| 5,646,994 A | 7/1997 | Hill |
| 5,680,123 A | 10/1997 | Lee |
| 5,782,878 A | 7/1998 | Morgan et al. |
| 5,793,420 A | 8/1998 | Schmidt |
| 5,959,529 A | 9/1999 | Kail, IV |
| 5,978,017 A | 11/1999 | Tino |
| 6,002,326 A | 12/1999 | Turner |
| 6,083,248 A | 7/2000 | Thompson |
| 6,117,073 A | 9/2000 | Jones et al. |
| 6,141,584 A | 10/2000 | Rockwell et al. |
| 6,188,939 B1 | 2/2001 | Morgan et al. |
| 6,211,907 B1 | 4/2001 | Scaman et al. |
| 6,301,502 B1 | 10/2001 | Owen et al. |
| 6,321,113 B1 | 11/2001 | Parker et al. |
| 6,389,339 B1 | 5/2002 | Just |
| 6,389,340 B1 | 5/2002 | Rayner |
| 6,390,996 B1 | 5/2002 | Halperin et al. |
| 6,398,744 B2 | 6/2002 | Bystrom et al. |
| 6,405,083 B1 | 6/2002 | Rockwell et al. |
| 6,481,887 B1 | 11/2002 | Mirabella |
| 6,526,219 B1 | 2/2003 | Posa et al. |
| 6,532,381 B2 | 3/2003 | Bayer et al. |
| 6,553,262 B1 | 4/2003 | Lang et al. |
| 6,593,848 B1 | 7/2003 | Atkins, III |
| 6,604,115 B1 | 8/2003 | Gary, Jr. et al. |
| 6,681,003 B2 | 1/2004 | Linder et al. |
| 6,727,814 B2 | 4/2004 | Saltzstein et al. |
| 6,747,556 B2 | 6/2004 | Medema et al. |
| 6,827,695 B2 | 12/2004 | Palazzolo et al. |
| 6,829,501 B2 | 12/2004 | Nielsen et al. |
| 6,831,556 B1 | 12/2004 | Boykin |
| 6,927,674 B2 | 8/2005 | Harter, Jr. et al. |
| 6,937,150 B2 | 8/2005 | Medema et al. |
| 6,950,013 B2 | 9/2005 | Scaman et al. |
| 6,957,102 B2 | 10/2005 | Silver et al. |
| 6,970,737 B1 | 11/2005 | Brodnick et al. |
| 6,993,386 B2 | 1/2006 | Lin et al. |
| 7,006,865 B1 | 2/2006 | Cohen et al. |
| 7,092,802 B2 | 8/2006 | Baldassa |
| 7,118,542 B2 | 10/2006 | Palazzolo et al. |
| 7,120,488 B2 | 10/2006 | Nova et al. |
| 7,122,014 B2 | 10/2006 | Palazzolo et al. |
| 7,129,836 B2 | 10/2006 | Lawson et al. |
| 7,162,306 B2 | 1/2007 | Caby et al. |
| 7,172,300 B2 | 2/2007 | Plaster |
| 7,202,792 B2 | 4/2007 | Zhang et al. |
| 7,231,258 B2 | 6/2007 | Moore et al. |
| 7,233,905 B1 | 6/2007 | Hutton et al. |
| 7,295,871 B2 | 11/2007 | Halperin et al. |
| 7,349,777 B2 | 3/2008 | Silverbrook |
| 7,380,951 B2 | 6/2008 | Plaster |
| 7,382,771 B2 | 6/2008 | Leblanc et al. |
| 7,386,376 B2 | 6/2008 | Basir et al. |
| 7,395,096 B2 | 7/2008 | Baratono et al. |
| 7,412,395 B2 | 8/2008 | Rowlandson |
| 7,425,889 B2 | 9/2008 | Widmann et al. |
| 7,436,429 B2 | 10/2008 | Tillotson |
| 7,444,315 B2 | 10/2008 | Wu |
| 7,496,439 B2 | 2/2009 | McCormick |
| 7,548,803 B2 | 6/2009 | MacCarthy |
| 7,564,479 B2 | 7/2009 | Schedivy |
| 7,650,291 B2 | 1/2010 | Rosenfeld et al. |
| 7,659,827 B2 | 2/2010 | Gunderson et al. |
| 7,768,548 B2 | 8/2010 | Silvernail et al. |
| 7,804,426 B2 | 9/2010 | Etcheson |
| 7,830,962 B1 | 11/2010 | Fernandez et al. |
| 7,840,277 B2 | 11/2010 | Matos |
| 7,912,646 B2 | 3/2011 | McCarthy et al. |
| 7,983,811 B2 | 7/2011 | Basir et al. |
| 8,010,286 B2 | 8/2011 | Templeton et al. |
| 8,045,685 B2 | 10/2011 | Lin et al. |
| 8,054,168 B2 | 11/2011 | McCormick et al. |
| 8,126,309 B2 | 2/2012 | Sakai |
| 8,149,108 B2 | 4/2012 | Hamel et al. |
| 8,215,422 B2 | 7/2012 | Abel |
| 8,630,768 B2 | 1/2014 | McClellan et al. |
| 8,666,590 B2 | 3/2014 | Follmer et al. |
| 8,930,040 B2 * | 1/2015 | Gompert ............... G07C 5/008 701/1 |
| 2001/0044732 A1 | 11/2001 | Maus et al. |
| 2002/0004729 A1 | 1/2002 | Zak et al. |
| 2002/0017405 A1 | 2/2002 | Nada |
| 2002/0123673 A1 | 9/2002 | Webb et al. |
| 2003/0212311 A1 | 11/2003 | Nova et al. |
| 2004/0077995 A1 | 4/2004 | Ferek-Petric et al. |
| 2004/0088374 A1 | 5/2004 | Webb et al. |
| 2004/0127774 A1 | 7/2004 | Moore et al. |
| 2004/0143466 A1 * | 7/2004 | Smith ............... G06Q 10/025 705/6 |
| 2005/0060186 A1 | 3/2005 | Blowers et al. |
| 2005/0113996 A1 | 5/2005 | Pillar et al. |
| 2005/0204310 A1 | 9/2005 | De Zwart et al. |
| 2005/0262533 A1 | 11/2005 | Hart et al. |
| 2005/0277872 A1 | 12/2005 | Colby et al. |
| 2005/0283438 A1 | 12/2005 | Brownewell et al. |
| 2006/0009809 A1 | 1/2006 | Marcovecchio et al. |
| 2006/0137699 A1 | 6/2006 | Moore et al. |
| 2006/0149597 A1 | 7/2006 | Powell et al. |
| 2006/0173500 A1 | 8/2006 | Walker et al. |
| 2006/0247549 A1 | 11/2006 | Chan |
| 2006/0259080 A1 | 11/2006 | Vaisnys et al. |
| 2006/0287586 A1 | 12/2006 | Murphy |
| 2007/0065793 A1 | 3/2007 | Benja-Athon et al. |
| 2007/0100213 A1 | 5/2007 | Dossas et al. |
| 2007/0118038 A1 | 5/2007 | Bodecker et al. |
| 2007/0198632 A1 | 8/2007 | Peart et al. |
| 2007/0203742 A1 | 8/2007 | Jones et al. |
| 2007/0255120 A1 | 11/2007 | Rosnov |
| 2007/0276270 A1 | 11/2007 | Tran |
| 2007/0276300 A1 | 11/2007 | Olson et al. |
| 2007/0299689 A1 | 12/2007 | Jones et al. |
| 2008/0018454 A1 | 1/2008 | Chan et al. |
| 2008/0042813 A1 | 2/2008 | Wheatley et al. |
| 2008/0058660 A1 | 3/2008 | Fischell et al. |
| 2008/0126134 A1 | 5/2008 | Jones et al. |
| 2008/0252412 A1 | 10/2008 | Larsson et al. |
| 2008/0300731 A1 | 12/2008 | Nakajima et al. |
| 2008/0319604 A1 | 12/2008 | Follmer et al. |
| 2009/0063187 A1 | 3/2009 | Johnson et al. |
| 2009/0222539 A1 | 9/2009 | Lewis et al. |
| 2009/0312998 A1 | 12/2009 | Berckmans et al. |
| 2010/0017471 A1 | 1/2010 | Brown et al. |
| 2010/0088010 A1 | 4/2010 | Verdejo et al. |
| 2010/0185341 A1 | 7/2010 | Wilson et al. |
| 2010/0298899 A1 | 11/2010 | Donnelly et al. |
| 2011/0117878 A1 | 5/2011 | Barash et al. |
| 2011/0124974 A1 | 5/2011 | Martin et al. |
| 2011/0133951 A1 | 6/2011 | Palmieri |
| 2011/0263946 A1 | 10/2011 | El Kaliouby et al. |
| 2011/0295078 A1 | 12/2011 | Reid et al. |
| 2011/0295446 A1 | 12/2011 | Basir et al. |

(56) References Cited

U.S. PATENT DOCUMENTS

| | | | |
|---|---|---|---|
| 2012/0004804 A1 | 1/2012 | Beams et al. | |
| 2012/0092497 A1 | 4/2012 | Hoetzer et al. | |
| 2013/0124090 A1 | 5/2013 | Gotschall et al. | |
| 2013/0296719 A1 | 11/2013 | Packer et al. | |
| 2013/0304146 A1 | 11/2013 | Aoyama et al. | |
| 2014/0062118 A1 | 3/2014 | Bourgraf et al. | |

FOREIGN PATENT DOCUMENTS

| | | | |
|---|---|---|---|
| JP | 2002-233512 A | 8/2002 | |
| JP | 2003-220045 A | 8/2003 | |
| JP | 2003260145 A | 9/2003 | |
| WO | WO-9221116 A1 | 11/1992 | |
| WO | WO-9700708 A1 | 1/1997 | |
| WO | 2006086089 A1 | 8/2006 | |
| WO | WO-2008116822 A2 | 10/2008 | |
| WO | WO-2011127459 A1 | 10/2011 | |
| WO | WO-2012026922 A1 | 3/2012 | |

OTHER PUBLICATIONS

Correspondence from Barry Chapin to Benjamin Fernandez dated Jan. 7, 2013, 2 pages.

Extended European Search Report issued in EP13800571.5, dated Jan. 5, 2016, 14 pages.

Gagliano, et al., "Wireless Ambulance Telemedicine May Lessen Stroke Morbidity," Telemedicine Today, [online] [retrieved on Aug. 30, 2013] retrieved from http://www2.telemedtoday.com/articles/wirelessambulance.shtml, 2 pages. cornia:tclesAwelessambulance.shtm, 2 pp.

Google search for the term "transmission of electrocardiograms from a moving ambulance", [retrieved on Sep. 10, 2013] retrieved from https://www.google.com/search?q=transmission+of+electrocardiograms+from+a-+moving+ambulance&oq=transmission+of+electrocardiograms+fro&aqs=chrome.1.6-9i57j0.12049j0&sourceid=chrome&ie=UTF-8, 85 pages.

lmielinski, et al. (Eds), Mobile Computing, Kluwer Academic Publishers, 2000, 1996 [online] [retrived on Sep. 12, 3013] retrieved from Google Books at http://books.google.com/books?id=gx3HVwcE0ZAC&pg=PA624&dq=portab-le+medical+locating+a+portable+wireless+communication+network&hl=en&sa=X&e-i=5XfAUaXqGsbn0QGMloHoCw&ved=0CBsQ6AEwAQ#v=onepage&q=portable%20medical%20-locating%20a%20portable%20wireless%20communication%20network&f=false, 1 page.

International Search Report and Written Opinion issued by the U.S. Patent and Trademark Office in International Application No. PCT/US2013/44357 mailed Feb. 3, 2014 21 pages.

Jain et al., "Towards a Comprehensive Technology for Recording and Analysis of Mulitple Physiological Parameters within their Behavioral and Environmental Context," [online] [retrieved on Aug. 23, 2013]. Retrieved fromhttp://www.psych-methoden.uni-koeln.de/mitarbeiter/jain/jain-6.htm, 12 pages.

Johnson, et al., "Remote Physiological Monitoring in the Home," in: Medical Informatics Europe '96: Human Facets in Information Technology (IOS Press, 1996, pp. 63-66).

Konoske, et al., "Evaluation of the Mobile Medical Monitor (M3) at Forward Levels of Care," Naval Health Research Center, Technical Document No. 98-2B, dated Feb. 2, 1999, 47 pages.

Lee, et al., "Informatics in Prehospital Care," Trauma Informatics Computers in Health Care 1998, pp. 31-44 (abstract), 1 page.

Nam, "Development of remote diagnosis system integrating digital telemetry for medicine," Engineering in Medicine and Biology Society, 1998. Proceedings of the 20th Annual International Conference of the IEEE (vol. 3) (abstract), 1 page.

Pahlavan, Kaveh et al., An Overview of Wireless Indoor Geolocation Techniques and Systems, C.G. Omidyar (Ed.): MWCN 2000, LNCS 1818, pp. 1-13, Springer-Verlag Berlin Heidelberg 2000.

Pavlopoulos, et al., "Ambulance'—mobile unit for health care provision via telmatics support," Engineering in Medicine and Biology Society, 1996 Bridging Disciplines for Biomedicine. Proceedings of the 18th Annual International Conference of theIEEE (vol. 3) (abstract), 1 page.

Poor, Robert, "Wireless Mesh Networks," Sensors, Feb. 1, 2003, retrieved on Aug. 2, 2012 from http://www.sensorsmag.com/networking-communications/standards-protocols/wireless-mesh-networks-968, 7 pages.

Schaldach, "Pacemaker Technology," Electrotherapy of the Heart, 1992, pp. 47-72 (abstract), 1 page.

ScienceDaily, "Telemedicine on Ambulances May Save Stroke Patients," Feb. 6, 1998 [online] [retrieved Aug. 23, 2013] [retrieved from http://www.sciencedally.com/releases/1998/02/980206071314.htm, 3 pages.

Weiss, "Implications of silicon monolithic RFICs for medical instrumentation and telemetry," Silicon Monolithic Integrated Circuits in RF Systems, 1998. Digest of Papers, Sep. 18, 1998 (abstract), 1 page.

ZOLL Data systems, ePCR Suite 5.0.2 Release Notes, 2 pages, Feb. 15, 2008.

ZOLL Data Systems, Hardware and Software Specifications, RescueNet Tablet PCR(TM), Tablet PCR Version 4.04, 22 pages, Nov. 2006.

ZOLL Data Systems, RescueNet ePCR Suite 4.04 to 5.0.2 Upgrade Guide, 83 pages, Apr. 14, 2008.

ZOLL Data Systems, RescueNet ePCR Suite 5.0 Hardware and Software Specifications Version 5.0, 33 pages, Jan. 24, 2014.

ZOLL Data Systems, RescueNet ePCR Suite 5.0 Install Guide, 70 pages, Jun. 25, 2007.

ZOLL Data Systems, RescueNet ePCR Suite 5.0 Install Guide, for new installs of RescueNet ePCR Suite Version 5.0.1.x, 84 pages, Nov. 28, 2007.

ZOLL Data Systems, RescueNet ePCR Suite 5.0.1 Upgrade Guide, 82 pages, Nov. 16, 2007.

ZOLL Data Systems, RescueNet ePCR Suite 5.0.2 Install Guide, 83 pages, Apr. 14, 2008.

ZOLL Data Systems, RescueNet ePCR Suite Security Overview, 4 pages, Feb. 5, 2008.

ZOLL Data Systems, RescueNet ePCR Suite Upgrade Guide, applies to upgrades of RescueNet ePCR Suite 5.0.1 to version 5.0.2, 28 pages, Apr. 14, 2008.

ZOLL Data Systems, RescueNet ePCR User and Administration Guide, Software version 5.00 Manual 1.00 revision 0, Chapters 1-34, 588 pages, 2007.

ZOLL Data Systems, RescueNet Field Data Administrator's Guide, Software version 4.04 Manual 4.0 revision 4, 282 pages, 2006.

ZOLL Data Systems, RescueNet Navigator 2.1 Release Notes, Software version 2.1.26, Apr. 2, 2015, 5 pages.

ZOLL Data Systems, RescueNet Tablet PCR 4.04 Install Guide, 30 pages, Nov. 15, 2006.

ZOLL Data Systems, RescueNet Tablet PCR User's Guide, Software version 5.0 Manual 5.0 revision 1, 102 pages, 2007.

ZOLL Data Systems, RescueNet TabletPCR 4.04 Known Issues, 1 page, Dec. 5, 2006.

ZOLL Data Systems, RescueNet TabletPCR User's Guide, Software version 4.04 Manual 4.0 revision 4, 100 pages, 2006.

ZOLL Data Systems, TabletPCR Version 4.04 Upgrade Guide, 28 pages, Nov. 15, 2006.

ZOLL Data Systems, Workflow Editor User's Guide, Software version 5.00 Manual 1.00 revision 0, 40 pages, 2007.

Zoorob, Roger J., "Acute Dyspnea in the Office," American Family Physician, Nov. 1, 2003, retrieved on Jan. 22, 2016 from http://www.aafp.org/afp/2003/1101/p1803.html?printable=afp.

* cited by examiner

RESPONSE MODE VERIFICATION IN VEHICLE DISPATCH

CROSS-REFERENCE TO RELATED APPLICATIONS

This application claims the benefit of U.S. Provisional Patent Application Ser. No. 62/141,786, filed on Apr. 1, 2015, the contents of which are incorporated by reference herein in their entireties for all purposes.

TECHNICAL FIELD

Embodiments of the present disclosure relate generally to data verification in vehicle dispatch.

BACKGROUND

Vehicle dispatch systems often rely upon vehicle crew input to indicate whether a vehicle is responding to a dispatch request. However, the dispatcher and/or the supervisor(s) of the vehicle crew members are unable to determine whether the vehicle actually begins moving toward the dispatch location when the vehicle crew acknowledges the dispatch request. For example, a vehicle crew might push a button to indicate that the vehicle is responding to a dispatch request, but the vehicle crew might delay starting the movement of the vehicle, unbeknownst to the dispatcher and/or the supervisor(s) of the vehicle crew.

Vehicle dispatch systems often rely upon manually entered odometer readings at various phases of the dispatch in order to make billing determinations related to the dispatch. Alternatively, vehicle dispatch systems that rely upon global positioning system (GPS) distance tracking or "fencing" often over- (or under-) estimate the actual distance through which the vehicle travels.

SUMMARY

In Example 1, a system for response mode verification according to an embodiment of the present disclosure includes a user interface device; a vehicle motion sensor located in a vehicle; a memory; and a processor communicably coupled to the user interface device, the vehicle motion sensor, and the memory, the memory including instructions that, when executed by the processor, cause the processor to: receive a dispatch request, receive a first indication from the user interface device based on a user indicating acceptance of the dispatch request, record an acceptance time of the first indication, receive a second indication from the vehicle motion sensor based on the vehicle motion sensor monitoring a change in movement of the vehicle, and record a vehicle motion time of the second indication, generate a notification indicating that a difference between the vehicle motion time and the acceptance time exceeds a threshold time.

In Example 2, the system of Example 1, wherein the user interface device, the memory, and the processor are located within the vehicle.

In Example 3, the system of any of Examples 1 to 2, wherein the vehicle motion sensor is a global positioning system device comprised by the vehicle.

In Example 4, the system of any of Examples 1 to 3, wherein the vehicle motion sensor is communicably coupled with a control system of the vehicle.

In Example 5, the system of any of Examples 1 to 4, wherein the vehicle motion sensor is configured to generate the second indication only when at least one of the following two conditions is met: the vehicle exceeds a threshold speed and the vehicle exceeds a threshold distance traveled.

In Example 6, the system of any of Examples 1 to 5, wherein the vehicle motion sensor is configured to generate the second indication only when both of the two conditions are met.

In Example 7, The system of any of Examples 1 to 6, wherein the dispatch request originates with a dispatcher, and wherein generating the notification further comprises sending the notification to the dispatcher.

In Example 8, the system of any of Examples 1 to 7, wherein generating the notification further comprises sending an electronic mail message.

In Example 9, the system of any of Examples 1 to 8, wherein the vehicle is operated by a crew, and wherein generating the notification further comprises sending the notification to a supervisor of the crew when the supervisor is not in the vehicle.

In Example 10, a system for odometer time stamp recordal according to an embodiment of the present disclosure includes a user interface device; an odometer located in a vehicle; a memory; and a processor communicably coupled to the user interface device, the odometer, and the memory, the memory including instructions that, when executed by the processor, cause the processor to: receive an indication from the user interface device based on a user indicating occurrence of an event, record an occurrence time of the indication, receive an odometer reading from the odometer, and record the odometer reading at the occurrence time in association with the event.

In Example 11, the system of any of Examples 1 to 10, wherein the indication is a first indication, the event is a first event, the occurrence time is a first occurrence time, the memory further including instructions that, when executed by the processor, further cause the processor to: receive a second indication from the user interface device based on the user indicating occurrence of a second event, recording a second occurrence time of the second indication, and recording the odometer reading at the second occurrence time in association with the second event.

In Example 12, the system of any of Examples 1-11, wherein the event is one of the following: the vehicle is enroute to a location of a medical emergency, the vehicle has arrived at the location of the medical emergency, and the vehicle is transporting a patient to a medical care facility.

In Example 13, the system of any of Examples 1 to 12, wherein the first event is one of the following and the second event is a different one of the following: the vehicle is enroute to a location of a medical emergency, the vehicle has arrived at the location of the medical emergency, and the vehicle is transporting a patient to a medical care facility.

In Example 14, the system of any of Examples 1 to 13, wherein the user indicating occurrence of the event comprises the user selecting a timestamp button on the user interface device.

In Example 15, a method for response mode verification according to an embodiment of the present disclosure includes receiving a dispatch request; receiving a first indication from a user interface device based on a user indicating acceptance of the dispatch request; recording an acceptance time of the first indication; receiving a second indication from a vehicle motion sensor based on the vehicle motion sensor monitoring a change in movement of a vehicle; recording a vehicle motion time of the second indication;

and generating a notification indicating that a difference between the vehicle motion time and the acceptance time exceeds a threshold time.

In Example 16, the method of Example 15, wherein the user interface device, the memory, and the processor are located within the vehicle.

In Example 17, the method of any of Examples 15 to 16, wherein the vehicle motion sensor is a global positioning system device comprised by the vehicle.

In Example 18, the method of any of Examples 15 to 17, wherein the vehicle motion sensor is communicably coupled with a control system of the vehicle.

In Example 19, the method of any of Examples 15 to 18, further comprising generating the second indication with the vehicle motion sensor only when at least one of the following two conditions is met: the vehicle exceeds a threshold speed and the vehicle exceeds a threshold distance traveled.

In Example 20, the method of any of Examples 15 to 19, further comprising generating the second indication with the vehicle motion sensor only when both of the two conditions are met.

In Example 21, the method of any of Examples 15 to 20, wherein receiving the dispatch request comprises receiving the dispatch from a dispatcher, and wherein generating the notification further comprises sending the notification to the dispatcher.

In Example 22, the method of any of Examples 15 to 21, wherein generating the notification further comprises sending an electronic mail message.

In Example 23, the method of any of Examples 15 to 22, wherein the vehicle is operated by a crew, and wherein generating the notification further comprises sending the notification to a supervisor of the crew, wherein the supervisor is not in the vehicle.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
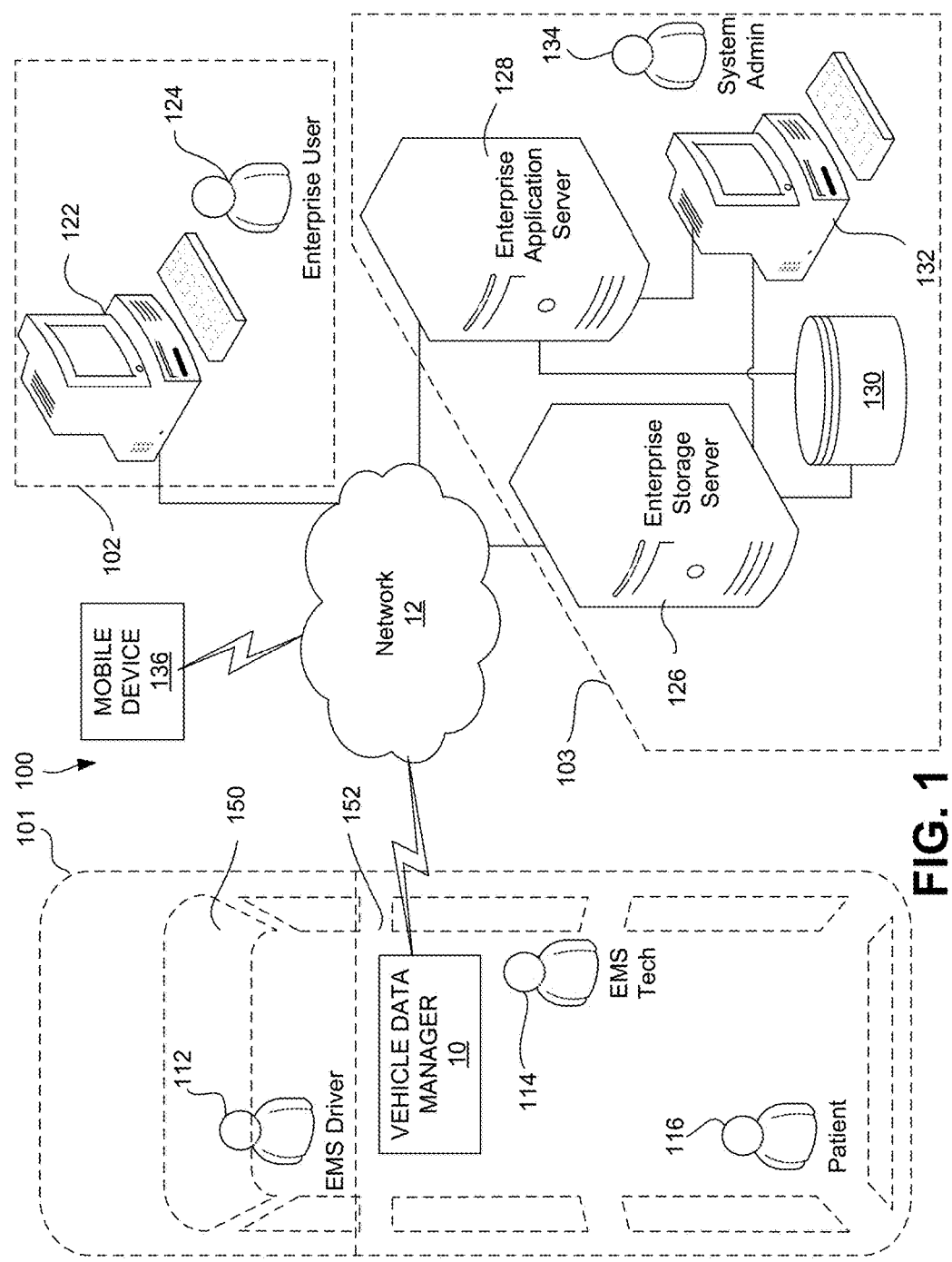
FIG. 1 illustrates an emergency medical services data management and access system, according to embodiments of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

There are several different implementations of the disclosure possible. Some possible implementations are described herein; however, as one of ordinary skill in the art would appreciate, these are exemplary implementations of the disclosure, which is not limited to the detailed examples provided.

FIGS. 1 through 5 are reproduced from U.S. Pat. No. 8,930,040, granted on Jan. 6, 2015, the contents of which are incorporated herein by reference in their entirety for all purposes.

As illustrated in FIG. 1, a system 100 according to embodiments of the present disclosure performs vehicle data management, for example driver performance and safety data management. System 100 includes a mobile environment 101, an enterprise environment 102, and an administration environment 103. Devices within the various environments 101, 102, 103 may be communicably coupled via a network 12, such as, for example, the Internet.

As used herein, the phrase "communicably coupled" is used in its broadest sense to refer to any coupling whereby information may be passed. Thus, for example, communicably coupled includes electrically coupled by, for example, a wire; optically coupled by, for example, an optical cable; and/or wirelessly coupled by, for example, a radio frequency or other transmission media. "Communicably coupled" also includes, for example, indirect coupling, such as through a network or a series of devices and/or communication protocols, or direct coupling. For example, "communicably coupled" may include coupled wirelessly via Wi-Fi and/or Bluetooth®. The network 12 may also take the form of an ad hoc, self-configuring, self-healing network.

According to embodiments of the present disclosure, the mobile environment 101 is an ambulance or other EMS vehicle—for example a vehicular mobile environment (VME). The mobile environment 101 may be an emergency vehicle such as an ambulance, a fire truck, a police car, a rescue helicopter, a boat, a fixed wing aircraft, or other emergency vehicle. The mobile environment may also be the local network of data entry devices as well as diagnostic and therapeutic devices established at time of treatment of a patient or patients in the field environment—the "At Scene Patient Mobile Environment" (ASPME). The mobile environment 101 may also be a combination of one or more of VMEs and/or ASPMEs. The mobile environment 101 may also be a work vehicle, such as, for example, a delivery vehicle, a public transportation vehicle, a waste management vehicle, or a hauling vehicle.

As illustrated in FIG. 1, an EMS technician 114, for example a paramedic or technician or other treatment professional, may be in the rear cabin 152 of the emergency vehicle 101 taking care of the patient 116, who may be laying in a bed or stretcher (not shown). The EMS driver 112 may be located in the front cabin 150 of the emergency vehicle 101, according to embodiments of the present disclosure. Although the vehicle data management system 10 is shown in the rear cabin 152, it may be located anywhere in the vehicle 101, and/or the location of its hardware and/or software may be distributed in different places throughout the vehicle 101.

The vehicle data management system ("VDM") 10 is communicably coupled to network 12, which is also communicably coupled with the enterprise environment 102 and the administration environment 103. A mobile device 136, for example a smartphone, may also be communicably coupled to network 12, according to embodiments of the present disclosure. The VDM 10, and other computers or devices described herein, may be or include a computer system 400 as described below with respect to FIG. 4, according to embodiments of the present disclosure. Functionality of the VDM 10 may also be performed using one or more circuits or integrated circuits or combination of computers and circuits, according to embodiments of the present disclosure. Although VDM 10 is described as one device or system, VDM 10 may be multiple devices, and its software and/or hardware which performs its described functions may be located on different devices or in different locations, according to embodiments of the present disclosure. According to some embodiments of the present disclosure, the VDM 10 is a box, housing, frame, and/or enclosure which includes a processor and a memory with instructions for carrying out the VDM's 10 functions as described herein, and which is communicably coupled to various devices and/or sensors within the vehicle 101, as well as to the network 12, according to embodiments of the present disclosure.

According to embodiments of the present disclosure, the VDM 10 is configured to establish a vehicle record. The vehicle record may be a set of data stored locally in the mobile environment 101 and/or transmitted via the network 12 to other environments for later storage, use, and integration with other vehicle records. The vehicle record may include the status of one or more conditions at particular moments in time or over ranges of time. In addition to creating the vehicle record, the VDM 10 may also alert drivers or other crew members of the vehicle 101 of particular situations, for example safety violations (actual and/or perceived), which may in some cases also be made part of the vehicle record. As such, all or a portion of the vehicle record may be a vehicle driving safety record, according to embodiments of the present disclosure.

In situations in which all of some of the VDM 10 is a box, the box may have an outer structure that is impact resistant, fire resistant, and/or water resistant and/or watertight, so that in the occurrence of a crash or other catastrophic event, the vehicle record stored on the VDM 10 may later be recovered, similar to a "black box" for an airplane, according to embodiments of the present disclosure.

Data from the VDM 10 (and therefore data from the devices communicably coupled with the VDM 10) may be received by one or more enterprise storage servers 126 in an administration environment 103 and stored in an enterprise database 130, and the same information may be accessed and provided by one or more enterprise application servers 128 to a workstation 122 of an enterprise user 124, according to embodiments of the present disclosure. The database 130 may be multiple databases which are linked; for example, vehicle speed data about a particular ambulance run in one database may be linked with patient data for the patient who was transported in another database, for example by a unique ambulance run identification number, according to embodiments of the present disclosure. According to embodiments of the present disclosure, the VDM 10 is communicably coupled to the storage server 126 which is communicably coupled to the database 130, and the application server 128 is communicably coupled to the database and to the enterprise workstation 122. Such devices may be communicably coupled via a network 12 such as, for example, the Internet.

When the VDM 10 receives updated information from one or more of the devices to which it is communicably coupled, the VDM 10 sends the updated information to the enterprise storage server 126, which stores the updated information in a database which may be contained on a storage medium 130, according to embodiments of the present disclosure. Hence, information collected by the vehicle data manager may be stored in a mobile memory 406, 408 (see FIG. 4), remote enterprise database 130, or both, according to embodiments of the present disclosure. An enterprise user 124, who may be an emergency room nurse monitoring and/or preparing for ambulance arrivals, an emergency room physician, and/or a medical director at home, for example, may access information similar to information collected by VDM 10 by requesting the information via an enterprise workstation 122. The enterprise user may also be a dispatcher or supervisor or other personnel who monitors vehicle activities, for example police or fire response personnel. For example, the enterprise workstation 122 accesses a web interface and/or thin client web browser application which requests the information over the network 12 from application server 128. Application server 128 queries the database 130 for the information, and returns a display to enterprise workstation, according to embodiments of the present disclosure. The application server 128 may be configured to stream data from the VDM 10, and/or to store data from the VDM 10, according to embodiments of the present disclosure.

According to embodiments of the present disclosure, the website display in the enterprise environment 102 is accessed via a generic internet browser by a supervisor or dispatcher for one or more ambulances 101 or other emergency vehicles. The website may be secured by logon username and password, for example. Each ambulance may be identified by a vehicle name; the supervisor chooses from a list of incoming vehicles, after which the data for that patient is displayed. The data may be shown just as it appears on the mobile screen, also in "clinical time." The vehicle data manager 10 collects information about driver behavior and/or performance, and sends the information, for example alerts about overforce or overspeed conditions, to the enterprise user 124. Alerts about driver performance issues or safety concerns may also be sent to a user via a mobile device 136, according to embodiments of the present disclosure.

According to yet other embodiments of the present disclosure, the enterprise user 124 is a vehicle fleet management operator, who accesses data about the driving performance and vehicle maintenance or "wear and tear" information via the enterprise workstation 122, in order to determine when maintenance should be scheduled, and/or the type of maintenance that may be recommended or necessary.

Figure 7:
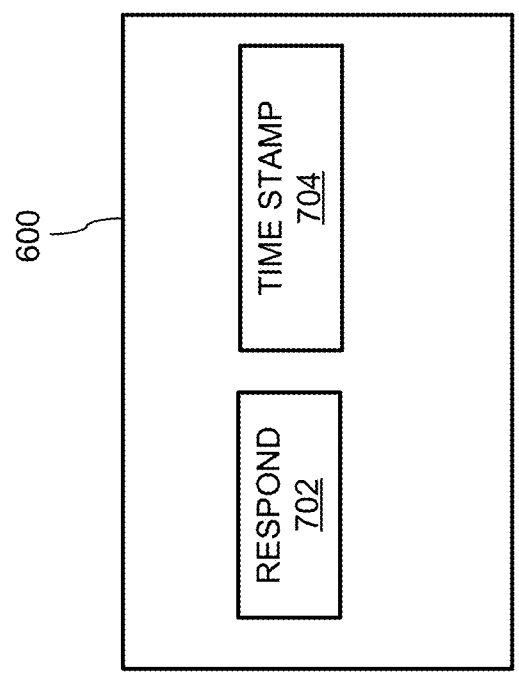
FIG. 7 illustrates a user interface, according to embodiments of the present disclosure.

Although FIG. 1 depicts a single VDM 10 in the mobile environment 101, more than one VDM 10 may be used in the mobile environment 101 to communicably connect to the same or a different set of devices and/or driver performance monitoring systems. And although FIG. 1 depicts one mobile environment 101, more than one mobile environment 101 and/or more than one VDM 10 may be communicably coupled with the administration environment 103 and/or the enterprise storage server 126, according to embodiments of the present disclosure, as illustrated in FIG. 7. According to embodiments of the present disclosure, the enterprise storage server 126 receives vehicle data information from VDM 10 and stores it in database 130 along with an authenticated time stamp and an identifier associating the information with a particular EMS crew member and/or a particular EMS vehicle. In this way, data from multiple vehicles and/or multiple crew members and drivers may be accessed by the enterprise user 124.

As also illustrated in FIG. 1, the enterprise storage server 130 may securely store the information received from one or more VDMs 10 for longer periods of time to permit later use of the information. For example, the VDM 10 may receive crew-identifying information such as name, address, employee number, and/or drivers license number via a crew member ID device 14, and then may convey some or all of the crew-identifying information to enterprise storage server 126 with a request for the enterprise storage server 126 to query the database 130 for past records involving the same crew member or vehicle. The enterprise storage server 126 may then forward any such records or portions of such records back to the VDM 10 to permit the VDM 10 to make any configurations and/or settings to the VDM 10. Similarly, such past vehicle record information may also be accessed by the enterprise user 124, according to embodiments of the present disclosure. A system administrator 134 may access and/or monitor the data in database 130 and/or modify the instructions of the servers 126, 128 via administration workstation 132, which may be communicably coupled to the servers 126, 128, according to embodiments of the present disclosure. The VDM 10 and server 126 may be configured to exchange data based on priority, cost, and/or size, according to embodiments of the present disclosure. For example, important data may be communicated in its entirety, while costlier or larger or less important data may be de-prioritized, or not communicated at all, between the VDM 10 and server 126, according to embodiments of the present disclosure.

According to some embodiments of the present disclosure, the VDM 10 transmits all vehicle record information to another device or devices via the network 12.

According to other embodiments of the present disclosure, the VDM 10 records all vehicle record information, either permanently or in a first-in-first-out memory, and transmits vehicle record information to another device or devices via the network 12 only for vehicle record information corresponding to a flagged event or time or time period. According to yet other embodiments of the present disclosure, the VDM 10 only records and/or transmits vehicle information corresponding to a flagged event or time or time period.

Figure 2:
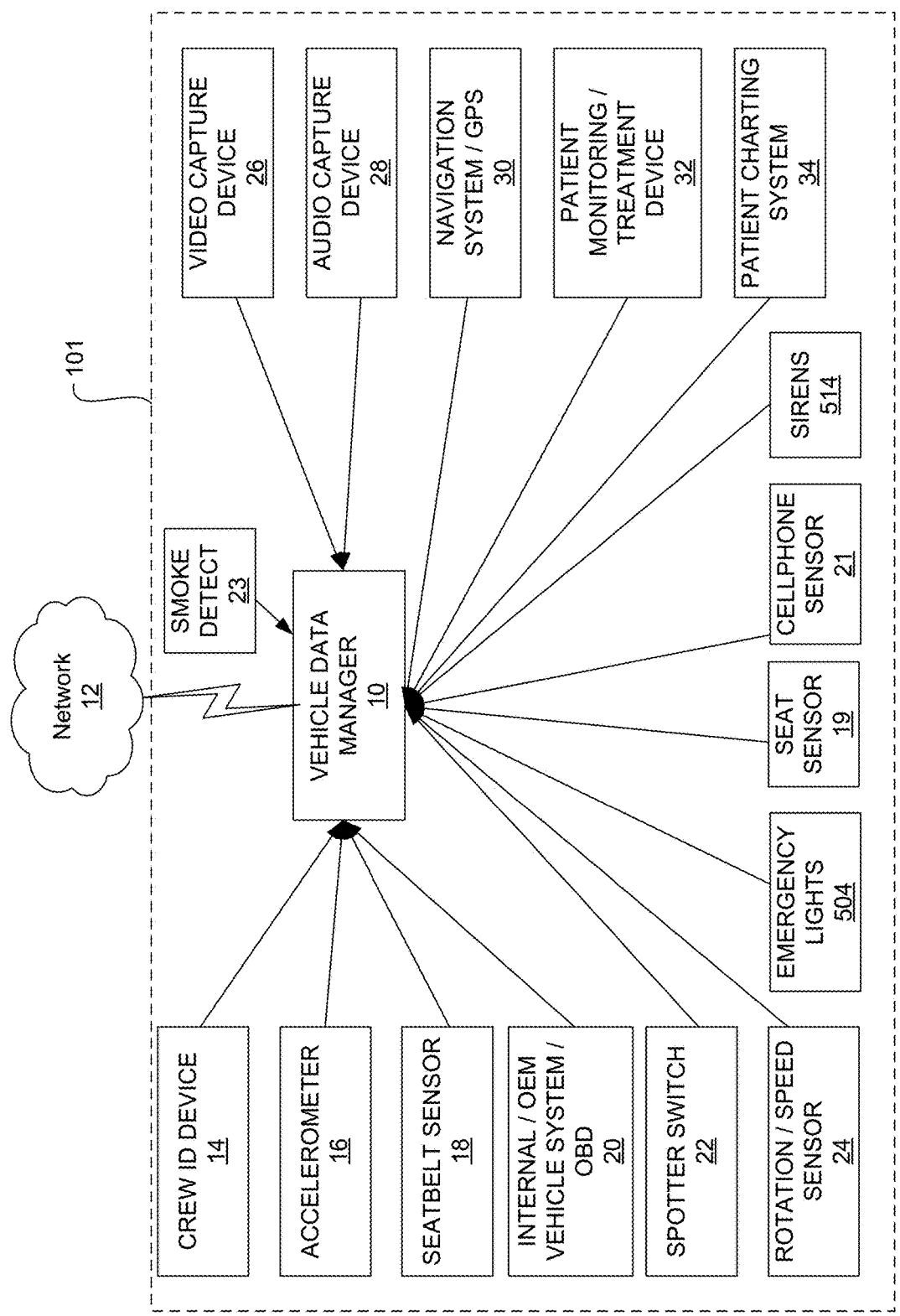
FIG. 2 illustrates devices in a mobile environment communicably coupled with a vehicle data management device so as to send information to the vehicle data management device, according to embodiments of the present disclosure.

FIG. 2 illustrates examples of some devices which may be communicably coupled to the VDM 10, according to embodiments of the present disclosure. Although FIG. 2 primarily illustrates devices from which VDM 10 may receive signals and/or other information about the vehicle, such coupling may permit two-way or bi-directional communication, or communication in a direction opposite to that shown in FIG. 2, according to embodiments of the present disclosure. And although various devices are described, such devices may be independent devices or may be coupled with other devices or share functionality with other devices, both those kinds of devices discussed herein, and those not discussed herein, according to embodiments of the present disclosure.

A crew identification (ID) device 14 may be communicably coupled to the VDM 10. The crew ID device 14 may be configured to receive an indication of an identity of a current crew member of the emergency vehicle 101, and pass the indication and/or identity on to the VDM 10, according to embodiments of the present disclosure. The crew ID device 14 may be, for example, an electronic card reader, an RFID reader, a keypad, a bar code scanner, or a biometric identification system such as a voice recognition system, a retinal scanner, a fingerprint identification system, a facial recognition system, and/or the like. Each employee may carry a unique identification card or badge or other physical media which provides an identity indication to the crew ID device 14, according to embodiments of the present disclosure. The crew ID device 14 may also include two or more different crew identification systems, for example a fingerprint authenticator in combination with an electronic card reader, according to embodiments of the present disclosure.

An accelerometer 16 may also be communicably coupled to the VDM 10. The accelerometer 16 may be configured to measure proper acceleration, which may also be referred to as a specific force, or g-force. The accelerometer 16 may be configured to provide a signal that can be used to calculate the current specific force, and/or provide an indication of a value of the specific force, to the VDM 10. According to some embodiments of the present disclosure, the accelerometer 16 may be a dual-axis accelerometer, which indicates a specific force in each of two perpendicular directions. These two perpendicular directions may be aligned to be parallel or substantially parallel to the plane of the ground surface over which the vehicle 101 travels, for example the plane formed by the lowermost point on each of the four tires. According to some embodiments of the present disclosure, one primary direction of alignment of the accelerometer 16 is parallel with the direction of travel of the vehicle 101, while the other primary direction of alignment of the accelerometer 16 is perpendicular with the direction of travel of the vehicle 101. The accelerometer 16 may also be a three-axis accelerometer. A combination of two independent accelerometers in a way that operates as a dual-axis accelerometer may also be referred to as a dual-axis accelerometer, and a combination of three independent accelerometers in a way that operates as a three-axis accelerometer may also be referred to as a three-axis accelerometer, according to embodiments of the present disclosure.

A seatbelt sensor 18 may also be communicably coupled to VDM 10. The seatbelt sensor 18 may be configured to provide a signal or an indication to VDM 10 about whether a particular seatbelt is engaged for a particular seat in the vehicle 101. The data from a seatbelt sensor 18 may be used in combination with the data from a seat sensor 19 to determine whether a user is seated in a particular seat. The seatbelt sensor 18 may include a switch in the particular buckle, according to embodiments of the present disclosure. The seat sensor 19 may include a seat proximity sensor to determine whether a user is on or near enough to the seat proximity sensor to indicate that the user is sitting in the seat, and/or a pressure sensor to determine whether enough pressure is exerted on the seat to indicate a user's presence in the seat, according to embodiments of the present disclosure. Both seatbelt sensor 18 and seat sensor 19 may also include signals from a vehicle's 101 on-board diagnostics or OBDII ("OBD") system 20, similar to the OBDII signal that also instructs a driver's instrument panel to chime when the vehicle reaches a particular speed without a particular seatbelt having been secured.

A cellphone sensor 21 may also be communicably coupled to VDM 10. The cellphone sensor may also be a Bluetooth® or other wireless communications protocol sensor, according to embodiments of the present disclosure. The cellphone sensor 21 may be configured to provide a signal to VDM 10 when a cellphone, for example a personal cellphone of driver 112, is sensed in the front cabin 150, and/or is sensed in transmitting mode in the front cabin 150, according to embodiments of the present disclosure. The VDM 10 may record in the vehicle data record a safety exception if such personal cellphone use is detected, and/or if such personal cellphone use is detected during a response procedure, during vehicle emergency operation, and/or when vehicle ignition is activated, according to embodiments of the present disclosure. A breath alcohol detector may also be communicably coupled to VDM 10, in order to confirm that the driver 112 is not impaired, according to embodiments of the present disclosure. According to some embodiments of the present disclosure, the VDM 10 may detect the presence of multiple wireless communications signals, and be able to determine which signals are being legitimately used by VDM 10 or other vehicle devices, and which are signals which correlate with personal mobile device use. These determinations may be made by VDM 10 based on process of elimination, according to embodiments of the present disclosure.

A spotter switch 22, which may also be communicably coupled to the VDM 10, may be a simple switch, for example a spring-loaded button, that may be pushed when the vehicle is backing up or in reverse, in order to indicate that a spotter is being used. Because a vehicle driver is typically unable to reach the steering wheel and gas pedals at the same time as the spotter switch 22, the spotter switch 22 may be used to indicate the physical presence of a spotter, also known as a ground guide, behind the vehicle 101 during backing procedures, according to embodiments of the present disclosure.

A smoke detector 23 may also be communicably coupled to the VDM 10. The smoke detector 23 may be configured to provide a signal to VDM 10 when smoke is detected, for example in the front cabin 150 and/or rear cabin 152. The VDM 10 may be configured to sound an audible alarm, provide a visual alarm, and/or record a safety exception in the vehicle data record based on the detection of smoke and/or carbon monoxide, according to embodiments of the present disclosure.

A rotation and/or speed sensor 24 may also be communicably coupled to the VDM 10. The speed sensor 24 may include a sensor and circuit that creates a wave with a frequency corresponding to the frequency of rotation of a wheel or axle, and circuitry or other mechanisms for counting the frequency and/or for directly counting the number of rotations of the wheel or axle. This information may be translated into vehicle speed information, either by the speed sensor 24 and/or by the VDM 10, for example by multiplying the number of rotations per second by the distance corresponding to each rotation in order to arrive at a vehicle distance traveled per second, according to embodiments of the present disclosure. A navigation system and/or GPS device 30 may also operate as a speed sensor, by providing a signal corresponding to, or calculating a value corresponding to, the change in distance of the GPS per change in time, according to embodiments of the present disclosure.

A video capture device 26 may also be communicably coupled to the VDM 10, according to embodiments of the present disclosure. The video capture device 26 may be any imaging device capable of capturing visual information within its field of view, for example, a camera or a camcorder, and transmitting some or all of such visual information to the VDM 10, according to embodiments of the present disclosure. For example, the video capture device 26 may be configured to capture at least four frames per second, or at least eight frames per second, or at least twenty frames per second, or at least one hundred frames per second, whether or not each of such frames are stored in memory and/or transmitted to the VDM 10, according to embodiments of the present disclosure. Video capture devices 26 may be internal and/or external to the vehicle 101, and can capture both events happening inside or outside the vehicle, as well as weather conditions, pedestrians, other vehicles, traffic signals, and the like.

An audio capture device 28 may also be communicably coupled to the VDM 10, according to embodiments of the present disclosure. The audio capture device 26 may be any audio device capable of capturing sound information, for example a digital sound recorder or a voice recorder, and transmitting some or all of such audio data to the VDM 10, according to embodiments of the present disclosure. The video capture device 26 and audio capture device 28 may be one device, for example in the form of a camcorder; alternatively, one audiovisual device with both audio and video capabilities may serve as an audio capture device 28 only, a video capture device 26 only, or both, according to embodiments of the present disclosure. The audio capture device 28 may also be configured to detect audio levels and/or ambient noise, for example the level of ambient noise in decibels, according to embodiments of the present disclosure.

The mobile environment 101 may also include a navigation system 30 communicably coupled to the VDM 10. Navigation system 30 may be used by the driver 112 to track the mobile environment's 101 position, locate the mobile environment 101 and/or the emergency location, and locate the transport destination, according to embodiments of the present disclosure. The navigation system 30 may include a Global Positioning System ("GPS"), for example. The navigation system 30 may also be configured to perform calculations about vehicle speed, the travel time between locations, and estimated times of arrival. According to embodiments of the present disclosure, the navigation system 30 is located at the front of the ambulance to assist the driver 112 in navigating the vehicle. The navigation system 30 may be, for example, a ZOLL® RescueNet® Navigator onboard electronic data communication system. The VDM 10 may also use such navigation systems to obtain posted road speeds, in order to make overspeed determinations, according to embodiments of the present disclosure.

A patient monitoring and/or treatment device 32 may also be communicably coupled with the VDM 10, according to embodiments of the present disclosure. The device 32 may be, for example, a defibrillator and/or monitor hooked up to and actively monitoring a patient, and configured to provide information about a patient's condition to the VDM 10 for storage and/or transmission along with other relevant non-patient data. For example, the device 32 may be configured to provide heart rate data, ECG waveform data, respiration data, blood pressure data, and the like, to the VDM 10.

A patient charting system 34 may also be communicably coupled to the VDM 10, according to embodiments of the present disclosure. The patient charting system 34 may be configured to provide information about a patient's identity or treatment to the VDM 10, according to embodiments of the present disclosure. According to other embodiments of the present disclosure, the VDM 10 is communicably coupled to a back-of-ambulance system (not shown) which is, in turn, communicably coupled to various clinical and non-clinical devices like the patient monitoring device 32, the patient charting device 34, and the navigation system 30, such as the back-of-ambulance system described in U.S. Patent Application Ser. No. 61/434,808, filed on Jan. 20, 2011, which is incorporated herein by reference in its entirety for all purposes. Such a back-of-ambulance system may be configured to provide patient information and/or navigation information in order to supplement the vehicle data record and/or provide context for various data items in the vehicle data record, according to embodiments of the present disclosure.

A vehicle's emergency lights 504 (such as external flashing lights) and sirens 514 systems may also be communicably coupled to VDM 10, according to embodiments of the present disclosure. This permits the VDM 10 to know when emergency lights 504 and sirens 514 are being used, in order to note such data in the vehicle data record and/or use such data for determining whether certain conditions have been satisfied.

Figure 5:
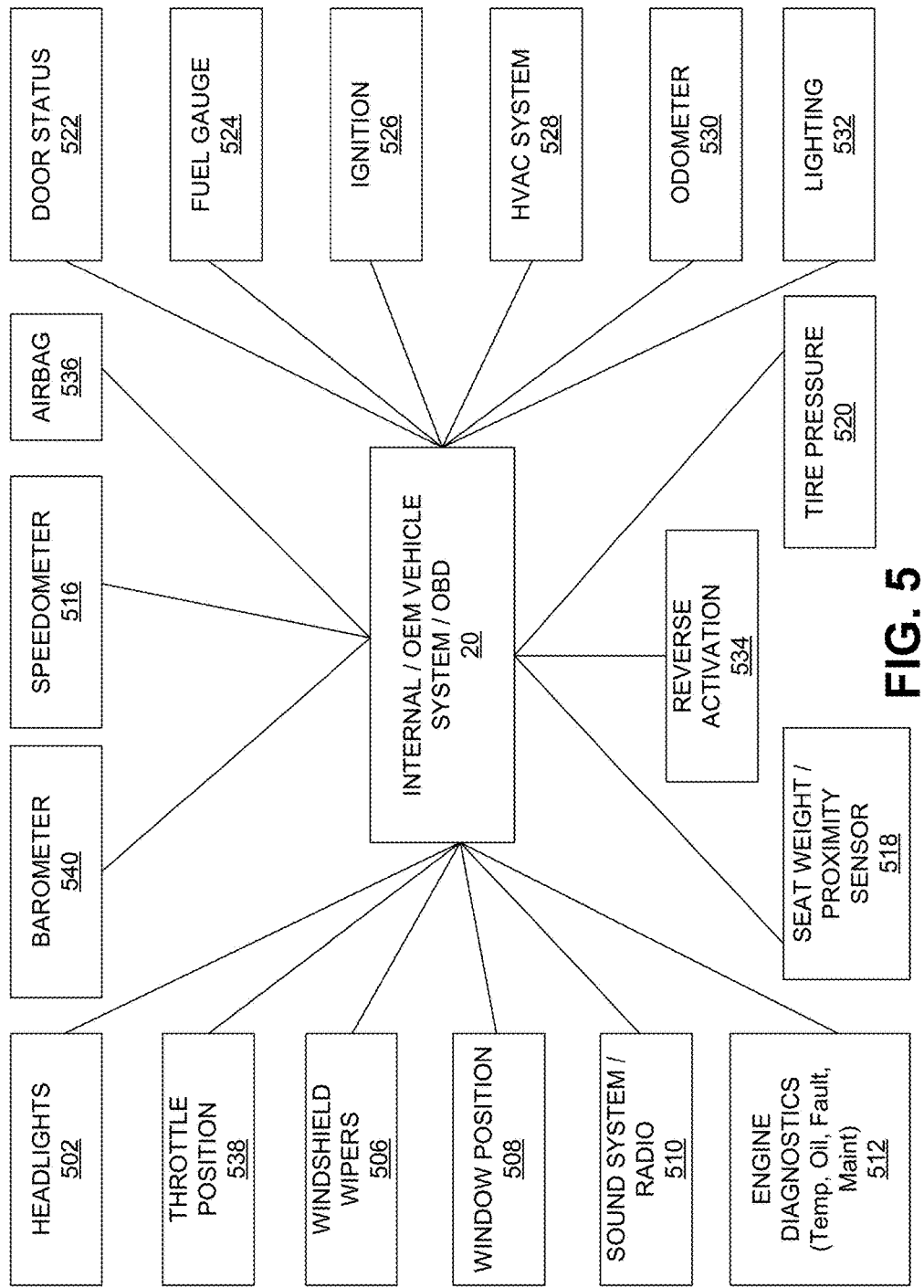
FIG. 5 illustrates internal vehicle and on board diagnostics devices and signalers, according to embodiments of the present disclosure.

The vehicle's internal electro-mechanical system or systems, which may include the original equipment manufacturer's (OEM) system as installed in the vehicle, the electrical signal indication component of which may be referred to as the OBD system 20, may also be communicably coupled to the VDM 10 and configured to transmit signals to the VDM 10 for the vehicle data record, according to embodiments of the present disclosure. As such, the installation of duplicate devices or sensors may be avoided by permitting the VDM 10 to "tap into" signals of the OBD system 20. Such OBD system 20 signals may be standard to all vehicles, and/or may be specific to a particular vehicle manufacturer. Some third party systems incorporated into vehicle 101 may include multiplexer systems which combine data from various sources; VDM 10 may be communicably coupled to such multiplexer system or systems, according to embodiments of the present disclosure. FIG. 5, described below, includes additional information about selected devices, sensors, and/or signals from the OBD system 20 that may be monitored by VDM 10, according to embodiments of the present disclosure.

Figure 3:
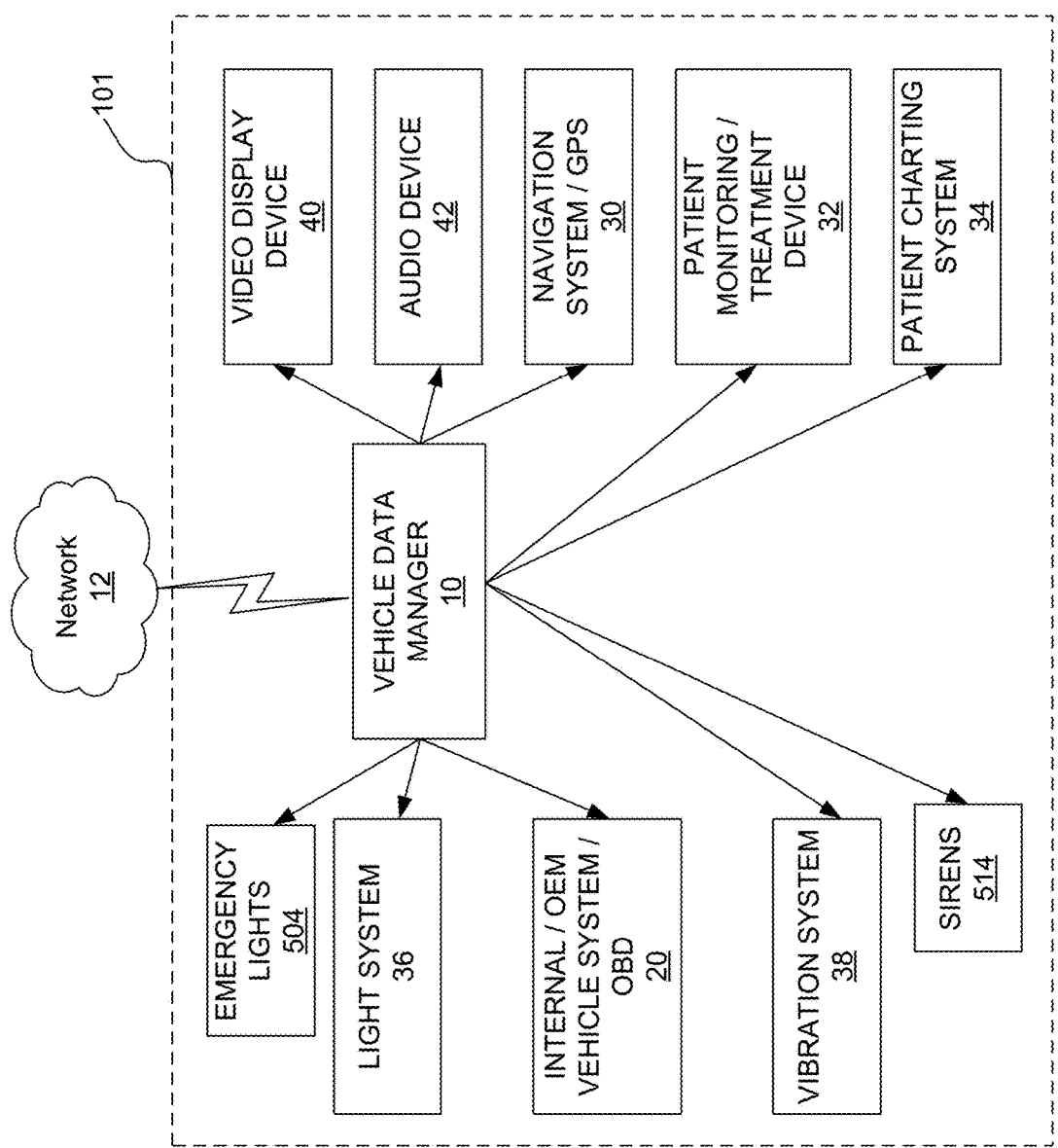
FIG. 3 illustrates devices in a mobile environment communicably coupled with a vehicle data management device, according to embodiments of the present disclosure.

FIG. 3 illustrates various devices and/or indicators that may be controlled, either totally or partially, by VDM 10, according to embodiments of the present disclosure. The VDM 10 may be communicably coupled to light system 36 in order to provide visual feedback to a crew member, for example a driver 112. The light system 36 may be, for example, a light bulb, an instrument lighting panel, a flash bulb or strobe light, an LED, or other light-producing device. The programming instructions of the VDM 10 may also control a light bulb or LED to turn on and off according to a particular pattern, even if the light bulb or LED is normally intended for long-term on and off use. For example, the VDM 10 may turn on an exterior camera display depending upon turn signal activation. If the driver is turning right, then the video display device 40 may be configured to display a feed from a right-side exterior camera (e.g. the camera in position 5 of FIG. 6) to permit the driver to determine if there are any vehicles or other obstructions in the right turn trajectory. The VDM 10 may also be configured to provide audio feedback to one or more users, for example the driver or crew members. As another example, the emergency lights 504 and/or sirens 514 may be remotely controlled from dispatch, for example from the enterprise user 124, according to embodiments of the present disclosure.

The VDM 10 may also provide signals or control commands to the internal vehicle system 20, in order to control OEM hardware. For example, instead of controlling an independent light system 36, the VDM 10 may control a vehicle lighting system 532 (see FIG. 5), for example the interior lighting system 532 which illuminates the vehicle 101 cabin when a door is opened, according to embodiments of the present disclosure. The VDM 10 may also be configured to receive a remote command to cycle on and/or off the personal computing hardware of the VDM 10 and/or other devices communicably coupled to the VDM 10, according to embodiments of the present disclosure. VDM 10 may also permit idle control: when the VDM 10 determines that the vehicle is idling and that the driver has activated the anti-theft system, the VDM 10 may also look at cabin temperature and battery level, and based on such observations, it may turn off the engine of the vehicle, according to embodiments of the present disclosure. In this way, automatic vehicle idle control may be achieved.

A vibration system 38 may also be communicably coupled to the VDM 10, and may be configured to accept commands for providing tactile feedback to a crew member or occupant of the vehicle 101. For example, the VDM 10 may be configured to activate vibration of the vibration system 38 located within a driver's 112 seat when the vehicle enters an overspeed condition, according to embodiments of the present disclosure. A vibration system may be included in a seat bottom, seat back, and/or steering wheel, according to embodiments of the present disclosure.

A video display device 40 may be used by the VDM 10 to display information to a crew member, according to embodiments of the present disclosure. The video display device 40 may be part of another device, for example the navigation system or a back-of-ambulance system, or may be a standalone video display device. The video display device 40 is configured to display still or moving pictures, text, colors, and other visual cues and signals. For example, the VDM 10 may be configured to make the video display device 40 flash a red display when the vehicle enters an overspeed condition. The video display device 40 may be, for example, a monitor, a screen, an LCD screen, a touch screen, a projection device, a plasma screen, and the like. According to some embodiments of the present disclosure, when a vehicle user activates a panic button, the VDM 10 notifies the server 128 and the server 128 causes a live video feed to be displayed on the enterprise user's 124 web browser.

An audio device 42 may be used by the VDM 10 to convey audible information to a crew member, according to embodiments of the present disclosure. The audio device 42 may be part of another device, for example the navigation system or a back-of-ambulance system, or may be a standalone device. The audio device 42 is configured to convey, for example by creating sound waves, audio information, such as voice messages, beeps, voice notifications, alerts, alarms, and other audio cues and signals. For example, the VDM 10 may be configured to cause the audio device 42 to beep when the vehicle enters an overspeed condition. The audio device 42 may be, for example, a speaker, a headphone, a headset, a bell, a siren, a radio, an intercom, a telephone, and the like. The VDM 10 may also use audio device 42 to deliver voice messages such as, for example, a "message of the day" from management. Such messages may encompass other safety aspects, and may also require confirmation (for example, for messages delivered in order to comply with particular regulations, standards, and/or protocol, to enter into the vehicle data record the fact that message delivery was acknowledged).

The navigation system 30, patient monitoring device 32, and/or patient charting system 34 may also be configured to receive signals and/or commands provided by the VDM 10, according to embodiments of the present disclosure. For example, the VDM 10 may be configured to cause the patient charting system to provide a visual indication to the crew member when a vehicle overforce condition is reached, warning the crew member to wait before inserting an intravenous device due to the possibility for jolting of the rear cabin 152, according to embodiments of the present disclosure.

Although FIGS. 2 and 3 depict one of each described device, the system 100 and/or each vehicle 101 may include multiple numbers of the described devices. For example, a seatbelt sensor 18 or seat sensor 19 may be included for each separate seat in the vehicle, to permit the VDM 10 to specifically determine the seating and seatbelt status for each seating position.

Some embodiments described herein of the present disclosure include various steps, some of which may be performed by hardware components or may be embodied in machine-executable instructions. These machine-executable instructions may be used to cause a general-purpose or a special-purpose processor programmed with the instructions to perform the steps. Alternatively, the steps may be performed by a combination of hardware, software, and/or firmware. In addition, some embodiments of the present disclosure may be performed or implemented, at least in part (e.g., one or more modules), on one or more computer systems, mainframes (e.g., IBM mainframes such as the IBM zSeries, Unisys ClearPath Mainframes, HP Integrity NonStop servers, NEC Express series, and others), or client-server type systems. In addition, specific hardware aspects of embodiments of the present disclosure may incorporate one or more of these systems, or portions thereof.

Figure 4:
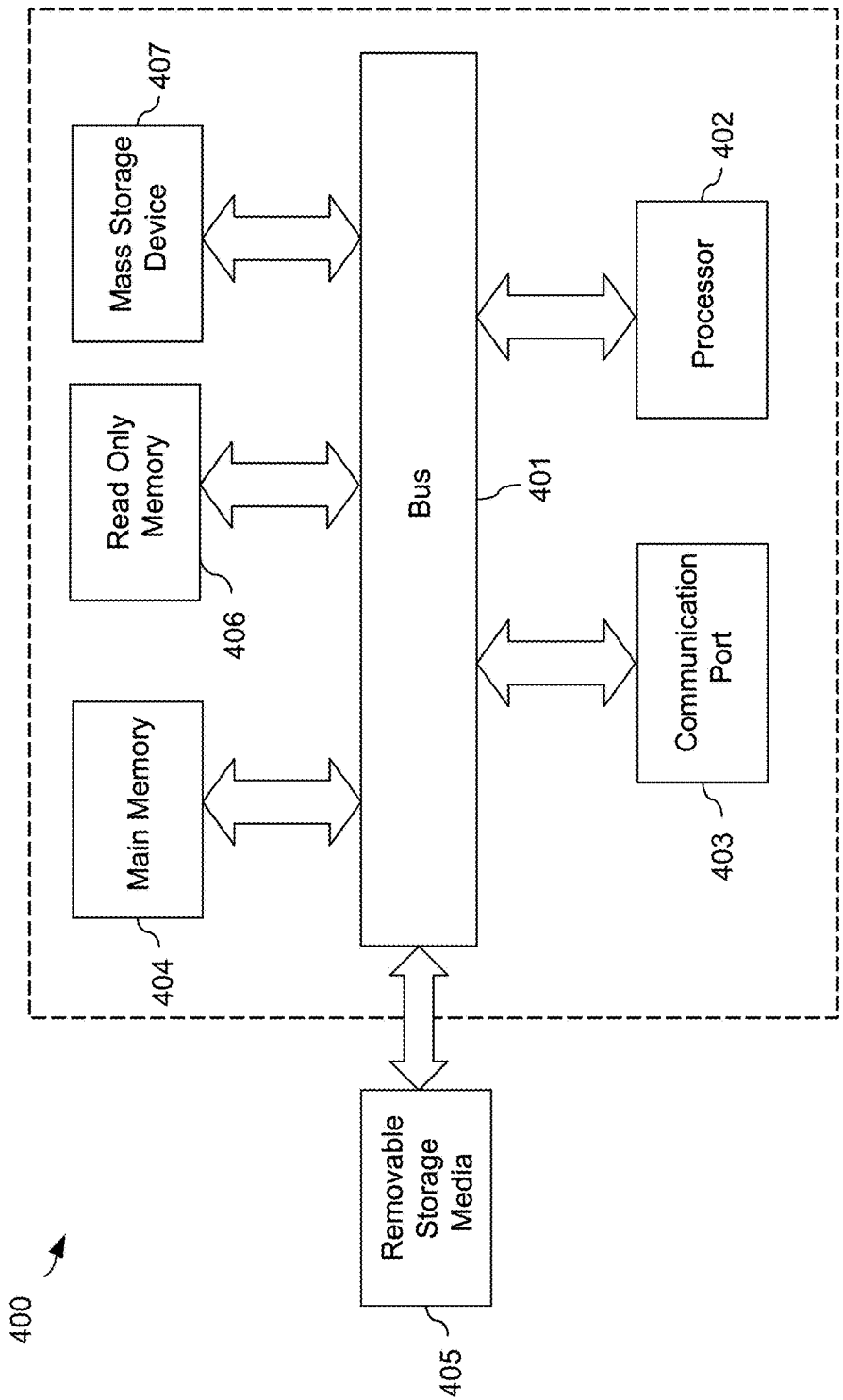
FIG. 4 illustrates a computing device or computer system, according to embodiments of the present disclosure.

As such, FIG. 4 is an example of a computer system 400 with which embodiments of the present disclosure may be utilized. According to the present example, the computer system includes a bus 401, at least one processor 402, at least one communication port 4003, a main memory 404, a removable storage media 405, a read only memory 406, and a mass storage 407.

Processor(s) 402 can be any known processor, such as, but not limited to, an Intel® Itanium® or Itanium 2® processor(s), or AMD® Opteron® or Athlon MP® processor(s), or Motorola® lines of processors. Communication port(s) 403 can be any of an RS-232 port for use with a modem based dialup connection, a 10/100 Ethernet port, a Bluetooth® or WiFi interface, or a Gigabit port using copper or fiber, for example. Communication port(s) 403 may be chosen depending on a network such a Local Area Network (LAN), Wide Area Network (WAN), or any network to which the computer system 400 connects. Main memory 404 can be Random Access Memory (RAM), or any other dynamic storage device(s) commonly known to one of ordinary skill in the art. Read only memory 406 can be any static storage device(s) such as Programmable Read Only Memory (PROM) chips for storing static information such as instructions for processor 402, for example.

Mass storage 407 can be used to store information and instructions. For example, hard disks such as the Adaptec® family of SCSI drives, an optical disc, an array of disks such as RAID (e.g. the Adaptec family of RAID drives), or any other mass storage devices may be used, for example. Bus 401 communicably couples processor(s) 402 with the other memory, storage and communication blocks. Bus 401 can be a PCI/PCI-X or SCSI based system bus depending on the storage devices used, for example. Removable storage media 405 can be any kind of external hard-drives, floppy drives, flash drives, zip drives, compact disc-read only memory (CD-ROM), compact disc-re-writable (CD-RW), or digital video disk-read only memory (DVD-ROM), for example. The components described above are meant to exemplify some types of possibilities. In no way should the aforementioned examples limit the scope of the disclosure, as they are only exemplary embodiments of computer system 400 and related components.

FIG. 5 illustrates examples various devices and/or signals which may be communicably coupled with the VDM 10 and/or which the VDM 10 may be configured to receive or provide, based on a communicable coupling with the vehicle's on board diagnostic and internal systems 20, according to embodiments of the present disclosure. For example, a vehicle 101 may have headlights 502, windshield wipers 506, a window position sensor 508 or indicator, a sound system and/or radio 510, engine diagnostics codes 512, for example codes indicating a temperature, oil pressure, maintenance, and/or engine fault condition. The vehicle 101 may further include a speedometer 516, which may be configured to provide a signal about the vehicle's speed, a seat weight and/or proximity sensor 518, a tire pressure indicator 520, a door status indicator 522 (for example, a code or device indicating whether a particular door is ajar), a fuel gauge 524, an ignition indicator 526, an heating, ventilation, and/or air conditioning (HVAC) system 528, an odometer 530 configured to indicate a vehicle's mileage, or distance traveled, as of a particular time, a lighting system 532, and a reverse activation indicator 534, which may be a code or device that indicates when the vehicle has been placed into reverse gear, according to embodiments of the present disclosure. The VDM 10 may also be communicably coupled with an airbag sensor 536, in order to enter into the vehicle data record information about airbag deployment, according to embodiments of the present disclosure. The VDM 10 may also be communicably coupled to a throttle position sensor 538, in order to enter into the vehicle data record information about whether the driver intended to accelerate or idle, for example. The VDM 10 may also be communicably coupled to a barometer or barometric pressure sensor 540, for example a device or signal that measures or represents a barometric manifold absolute pressure, or simple barometric pressure, according to embodiments of the present disclosure.

A VDM 10 according to embodiments of the present disclosure creates a vehicle record, for example a vehicle driving safety record, based on various types of information which may include, without limitation, driver identification information, seatbelt information, vehicle backing information, force information, and speed information, according to embodiments of the present disclosure.

The VDM 10 may be configurable to generate individual tone activations (e.g. on/off tone activations delivered through the audio device 42) which are user configurable. The VDM 10 may deliver various types of tones, for example a growl (e.g. clicking, or "Geiger counter" type sound), intermittent tone, steady violation tone, and voice messages. The intermittent and steady tones may vary in pitch. These tones may be applied to all users, but the volume level may be customized by each user according to various versions of VDM 10. In some cases, the VDM 10 may use growling tones and intermittent tones as warnings and reminders, while using steady tones to indicate violations. Voice messages may be utilized to describe a particular warning or violation, and/or to delivery user-defined messages to the crew.

According to some versions of VDM 10, the tone settings are configurable for individual vehicles, groups of vehicles, and/or the entire fleet. For example, while a driver 112 of a particular vehicle 101 may be able to customize the tone settings for that particular vehicle 101, an enterprise user 124 may be able to configure the tone settings for each vehicle 101, groups of vehicles, and/or the entire fleet controlled via enterprise workstation 122. According to some embodiments of the present disclosure, the driver 112 and/or crew member 114 may turn off an indicator light which is normally configured to convey warning alerts from the VDM 10.

According to some embodiments of the present disclosure, the user may activate with the VDM 10 an automatic audible feedback volume control based on vehicle speed, siren activation, and/or ambient noise level. For example, the user may configure the VDM 10 to increase the volume of a message delivered via the audio device 42 based on the VDM 10 sensing a siren activation signal from the siren module 514, or based on the VDM 10 sensing a vehicle speed (e.g. from either the speedometer module 516 and/or the vehicle speed sensor 24) that is beyond a certain threshold. According to other embodiments of the present disclosure, the VDM 10 adjusts the volume of such audio messages proportionally according to the current speed value.

The VDM 10 may also include a driver identification routine or routines, according to embodiments of the present disclosure. The VDM 10 in some versions may permit driver logon at any time, and may confirm it with a confirmation tone delivered via the audio device 42. The driver ID device 14 may be configured to accept an indication from a driver, for example via a programmable driver ID tag that is unique to the particular system 100, and optionally a user-defined unique location identification.

In some versions, the VDM 10 may assign all recorded vehicle and driver data to the particular driver which is logged on when the data is recorded, for the entire "run" during which the driver was logged in. The "run" ends when the currently logged on driver is logged off. Logoff occurs when another driver is logged on to the system, when no ignition signal 526 signal is detected or no engine rotation signal 24 is detected for a particular duration of time (for example one minute), or when the currently logged on driver logs off of the system. This system logoff may occur when the currently logged on driver performs another logon procedure, for example by swiping the same card through a card reader. The VDM 10 may then confirm the logoff with a tone, for example a different tone or different tone pattern than the logon tone or tone pattern. This may be a double beep for logoff, and a single beep for logon. The VDM 10 may retain in its memory the information about the current driver through the entire vehicle mission or "run," even in the vent of data downloads from VDM 10, uploads, and/or power fail situations.

According to some embodiments of the present disclosure, the driver may log on to the VDM 10 system via a proximity device like an RFID transceiver, a biometric system, and/or an interface to another data source that may already contain the information about the current driver, such as a crew scheduler software application. If a crew scheduler software application is used by VDM 10 to indicate the current driver, the VDM 10 may prompt the driver for confirmation before logging on the driver, according to embodiments of the present disclosure.

According to some embodiments of the present disclosure, the VDM 10 permits remote login through its connection with network 12. For example, a dispatcher, who may be using enterprise workstation 122, may remotely log on a driver or a crew member into the VDM 10 system, according to embodiments of the present disclosure.

The VDM 10 may deliver via audio device 42 a voice message, or via video display device 40 a video message, at the time of crew member logon. This message, as well as the options for its delivery, may be configurable by the user. For example, a particular driver 112 may configure VDM 10 to deliver the greeting message to the particular driver 112 only once per day, regardless of the number of times that the same driver 112 logs on to the VDM 10 system, according to embodiments of the present disclosure.

The content of such voice or video messages may also be customized to each user and/or vehicle and/or situation. For example, once VDM 10 determines a particular driver's identity, the VDM 10 may be configured to deliver a voice message that says, "Welcome, driver. This is_____ your login to this vehicle," in which the VDM 10 fills in the blank with a voice representation of a number of times which the same driver has logged on to the same vehicle, for example "first" or "tenth" or "one hundred forty-seventh," according to embodiments of the present disclosure. According to other embodiments of the present disclosure, the VDM 10 is configured to provide customized messages to the user based on the user's classification, for example if the user is a supervisor, the VDM 10 says at login "welcome supervisor," but if the user is not a supervisor, the VDM 10 plays at login "welcome driver." This information which the VDM 10 uses to identify whether the driver falls into a particular class may be stored locally in VDM 10, stored remotely in remote database 130, and/or stored on the user's ID media, for example the user's RFID enabled identification badge. The VDM 10 may also recognize, based on the driver's identification or based on previously stored information, that the driver's name is John Doe, and may be configured to deliver a greeting via audio device 42 that says "Welcome John Doe."

In addition to tracking the identity of the current driver, the VDM 10 may also be configured to accept and track the identities of one or more crew members. For example, a crew ID device 14 may be located in the rear cabin 152 and permit a crew member to log in a fashion similar to the driver login described above. A crew ID device 14 may also be located on the exterior of the vehicle 101, for example on one or both rear corners, to permit a spotter to identify him or herself while at the same time indicating their presence and function as a spotter. Crew identification data may also come to VDM 10 from another application, such as a crew scheduling software application either locally or on enterprise workstation 122, according to embodiments of the present disclosure. The crew identification and logon process may use the same or different tone, voice messaging, and/or data recording as used for the driver, according to embodiments of the present disclosure.

In some cases, if the VDM 10 detects the presence of ignition or an RPM signal for the engine (for a customizable, or developer-defined, duration and/or combination of time and presence of a speed parameter), and there is no driver logged in, then the VDM 10 may log in an "unknown driver" for the vehicle data record. The system functionality and reporting capabilities for the unknown driver may be the same as those for known drivers. In some versions, if the VDM 10 detects ignition or an engine RPM signal, and no speed, while the unknown driver is logged on, the VDM 10 may deliver an intermittent tone. If speed is detected while the unknown driver is logged on in such situations, a steady tone may be sent through the audio device 42 by VDM 10.

According to embodiments of the present disclosure, the VDM 10 delivers a voice message concerning unknown driver activity, for example a voice message that says "Unknown driver" or the like. According to some embodiments of the present disclosure, the VDM 10 permits customized settings, for example for safety exception/violation reports and driver audible feedback, based on the individual driver identity and/or the group or classification to which the driver is assigned. Such classification or individual identity may be obtained from the crew ID device 14 and/or obtained from an outside data source such as a crew scheduling system, according to embodiments of the present disclosure. For example, a supervisor may be able to drive at a higher speed than a non-supervisor, without an overspeed violation tone, and a driver having a probationary classification, or an unknown driver, may have lower overspeed settings than both the supervisor and non-supervisor or EMT, according to embodiments of the present disclosure.

The VDM 10 may also detect an attempted improper driver change and either record or prohibit or warn against the change if a new driver login is received when the vehicle is traveling faster than a predetermined speed, according to embodiments of the present disclosure.

According to embodiments of the present disclosure, the VDM 10 tracks seatbelt data and/or seat sensor data for one or more seats. For example, the VDM 10 receives a signal from the seatbelt sensor 18 of the driver 112, and sounds a tone when a vehicle speed is detected while the driver's seatbelt is unfastened or unbuckled, or is unfastened or unbuckled for a user defined period of time. According to embodiments of the present disclosure, the VDM 10 plays a user customized voice message via audio device 42 when a seat belt violation is detected. According to other embodiments, the VDM 10 receives a signal from seat sensor 19 indicating that an individual is seated in the particular chair, but receives a signal from the corresponding seatbelt sensor 18 indicating that the seatbelt is not fastened for that particular chair, and based on the determination provides an alert to the driver and/or the particular user seated in the seat and/or another crew member, and/or records the seatbelt violation in the vehicle record. The VDM 10 may track the seatbelt status and seating status of each seat in the vehicle, and/or the safety straps and/or presence of a patient in the patient cot, according to embodiments of the present disclosure. Sensing whether a patient is in the patient's cot or whether the patient is properly restrained in the patient cot may permit the VDM 10 to store data that may be used to evidence compliance with a particular regulation, standard, and/or protocol. The VDM 10 may also be configured to generate a warning message and/or record a safety exception in the vehicle record if the seatbelt is fastened before a user is detected in the chair, according to embodiments of the present disclosure. The VDM 10 may also interface with other third party systems, or the vehicle's on board systems 20, which also detect the seatbelt and/or seating status for multiple seating positions, according to embodiments of the present disclosure.

The VDM 10 may also track what may be referred to as "backing" information for the vehicle 101. In large vehicles like ambulances, it is often difficult for the driver to see potential obstacles located behind the vehicle, which must be avoided while backing up the ambulance. Thus, a spotter may be advantageous, because the spotter may stand behind the vehicle and shout information and/or use hand gestures to alert the driver of obstacles, or to direct the driver about which way to turn or how fast to go. A vehicle 101 may include a spotter switch 22. When the VDM 10 senses that the vehicle is in reverse drive, for example from a reverse activation signal 534, and if any vehicle speed is detected for a certain amount of time (e.g. two seconds or more), the VDM 10 may be configured to accept the activation of the spotter switch 22 for a user defined period of time before and after the start of the reverse activation, and the switch activation may serve to indicate the activation for a user defined period of time, which may eliminate the need for multiple switch depressions during subsequent back-and-forth backing maneuvers. This may be particularly beneficial for a parallel parking maneuver, according to embodiments of the present disclosure.

The backing alerts and reporting activation criteria (for entry into the vehicle record) may be user configurable on a vehicle-by-vehicle basis. If the VDM 10 begins to implement the spotter logic, and does not detect a spotter switch 22 activation, an intermittent tone may be produced to remind the driver of the spotter requirement. Detection of the spotter switch 22 activation may halt the tone. If the user-defined time parameters expire during a detected backing occurrence, and if there has been no spotter switch 22 activation, a steady tone for a limited length of time may be produced, indicating that a violation has occurred. If the time parameter expires while the vehicle is still in reverse, the violation tone may continue until the vehicle is taken out of reverse or the spotter switch 22 is activated, according to embodiments of the present disclosure.

The VDM 10 according to embodiments of the present disclosure may sense specific forces (e.g. G-forces) experienced by the vehicle 101, and/or calculate acceleration experienced by the vehicle 101, and determine a force value based on the measurements and/or calculations. According to some embodiments of the present disclosure, the VDM 10 uses the accelerometer 16, which may be a dual- or triple-axis accelerometer, to determine an instantaneous specific force being experienced by the vehicle 101. For this purpose, the accelerometer 16 may be rigidly fixed to the vehicle 101, such that any acceleration experienced by the vehicle 101 are also experienced by the accelerometer 16. The instantaneous specific force may include one force component substantially aligned with the direction of normal travel of the vehicle 101, for example the front-to-back direction. The instantaneous specific force may also include a force component substantially perpendicular to the direction of normal travel, for example the side-to-side direction. According to some embodiments of the present disclosure, the VDM 10 receives from accelerometer 16, and/or determines based on signals received from the accelerometer 16, an instantaneous specific force that is a magnitude of the vector sum formed by the front-to-back force vector component and the side-to-side force vector component. This instantaneous specific force magnitude may be referred to as an accelerometer specific force.

According to other embodiments of the present disclosure, the VDM 10 receives from accelerometer 16, and/or determines based on signals received from the accelerometer 16, an instantaneous specific force that is a magnitude of the vector sum formed by the front-to-back force vector component, and any side-to-side force vector component experienced while the speed of the vehicle is above a certain speed setpoint. This "masking" of the side-to-side force vector component based on vehicle speed may assist VDM 10 in filtering "false" or undesired overforce readings caused, for example, by centripetal force exerted on the vehicle 101 when the vehicle 101 is turning. As used herein, the term "instantaneous" when applied to a force or speed or other measurement or value is used in its broadest sense to refer to a particular value at the moment in time, and/or an averaged value over times at or near to the particular moment in time, and/or smoothed values over times at or near to the particular time. For example, the VDM 10 may use, when implementing its logic, an instantaneous specific force magnitude that is determined from averaging accelerometer 16 measurements made each ten milliseconds.

The VDM 10 may also determine actual vehicle 101 acceleration in a different way, for comparison with the accelerometer specific force (both of which may be expressed in distance per square second). The VDM 10 receives high precision speed information from speed sensor 24, for example in the form of pulses or "clicks" which may be counted over time. As on example, a very high precision speed sensor may be configured to provide several thousand discrete pulses or clicks for a given revolution of the drive shaft and/or axle and/or vehicle wheel. This permits the VDM 10 to determine an instantaneous speed of the vehicle 101, for example by measuring average time between pulses. The VDM 10 may calculate a rate of change of the instantaneous vehicle speed to determine an instantaneous acceleration. Prefiltering may be used for the accelerometer 12 and/or speed sensor 24 signals in order to smooth the signals, according to embodiments of the present disclosure.

According to some embodiments of the present disclosure, the VDM 10 compares, for a particular moment in time or range of time, the accelerometer specific force with the instantaneous acceleration, and uses the lower value of the two as the current observed acceleration of the vehicle. This may reduce the probability of obtaining "false" or undesirable overforce alerts or records when one device experiences an anomalistic spike based on activity unrelated to unsafe driving. For example, the accelerometer 16 may sense a spike in specific force if the vehicle 101 hits a bump in the road, while the instantaneous acceleration falls well within the acceptable range—using the lower observed acceleration value may prevent a warning tone and a violation record. The VDM 10 compares the current observed acceleration of the vehicle to a preset acceleration (or g-force) value. This preset acceleration or g-force value may be referred to as the "safe force." The safe force may be similar to the SAFE-FORCE® value as measured by the ZOLL RescueNet Road Safety system, according to embodiments of the present disclosure. When the observed acceleration exceeds the safe force, the VDM 10 may be configured to alert the crew member (e.g. the driver), and/or create an entry in the vehicle record to reflect a safety violation.

According to some embodiments of the present disclosure, the VDM 10 is configured to warn the driver before the observed acceleration reaches the safe force. For example, the VDM 10 may be configured to provide, through the audio device 42, a growling noise when the observed acceleration exceeds eighty percent of the safe force value. The VDM 10 may be configured to escalate the growling noise to an intermittent tone indication when the observed acceleration exceeds ninety percent of the safe force value, and may be configured to provide a loud steady tone noise/alarm when the observed acceleration exceeds the safe force value, to indicate an actual violation, according to embodiments of the present disclosure. These ranges and/or tones may be customized, for example, the growling may indicate an observed acceleration of ninety to one hundred percent of safe force, a steady tone may indicate an observed acceleration of 100 to 110% of safe force, and a strong tone or alarm may indicate a severe overforce condition of over 110% of safe force, according to embodiments of the present disclosure.

According to other embodiments of the present disclosure, the VDM 10 may be configured to implement a "grace period" before warning a driver and/or recording a safety exception in the vehicle record. For example, the VDM 10 may be configured to identify a particular condition only if the condition is maintained for a particular amount of time, for example at least a half second. According to other embodiments, the VDM 10 is configured to provide to the user a voice message, video message, or other indication that the user is about to be warned of, and/or reported as, violating a safety rule, and to give the user a certain amount of time to correct the perceived safety violation.

According to embodiments of the present disclosure, the user (e.g. the vehicle fleet manager) may define force settings or values as percentages of the safe force. For example, the user may define a warning range, a low overforce range, and a high overforce range. When the observed acceleration reaches the warning setting, the VDM 10 produces a growl (e.g. through audio device 42). As the force level increases, the frequency of the growl may increase (from slow to fast), until a low overforce setting is reached. When the low overforce setting is reached or exceeded, the VDM 10 may produce a steady tone for the duration of the low overforce occurrence. When the observed acceleration reaches or exceeds the value of the high overforce setting, the VDM 10 may produce a tone of a higher frequency during the entire time when the high overforce condition is detected. According to some embodiments of the present disclosure, the VDM 10 causes a growl to be produced for at least one second, to indicate a warning before noting any violation.

According to some embodiments of the present disclosure, the warning and overforce ranges may be configurable, for example configurable based on the driver's identity. The VDM 10 may determine the driver's identity via the crew ID device 14, and then set the warning and overforce ranges accordingly. For example, when the driver 112 is determined to have a vehicle maintenance personnel classification, the VDM 10 may be configured to raise the warning and overforce settings much higher to facilitate vehicle problem diagnosis by the driver.

The VDM 10 according to some embodiments of the present disclosure is also configured to monitor vehicle speed, and in overspeed conditions to notify the driver and/or crew, and/or to record a violation in the vehicle record. The VDM 10 may be configured with different settings for emergency and non-emergency driving. For example, emergency driving may permit higher safe force values that non-emergency driving. The emergency driving setting may be activated with a button or switch. For example, the VDM 10 may be configured to enter the emergency driving settings when it detects that the emergency lights 504 and/or sirens 514 have been activated. According to some embodiments of the present disclosure, the VDM 10 may be configured to accept a remote command, for example from a dispatcher 124 via an enterprise workstation 122, to activate or de-activate emergency driving settings. For example, when the dispatcher 124 sends out an EMS response command via enterprise workstation 122, and a particular vehicle 101 indicates (for example in its navigation system 30) that it is responding, the authorization to VDM 10 to enter emergency driving status may be received either with the initial dispatch, or via a subsequent automatic or manual activation by the dispatcher 124 via workstation 122.

Emergency and non-emergency driving settings may include various settings, similar to the safe force settings.

For example, the VDM 10 may be configured to act upon an overspeed setting, a high overspeed setting, and a duration setting. The overspeed and high overspeed values may be set as either a maximum speed (e.g. in miles per hour or kilometers per hour). According to some embodiments of the present disclosure, the VDM 10 receives location information and/or posted speed limit information from the navigation system 30, in order to determine the posted speed limit at the current vehicle 101 location. The overspeed and high overspeed values may alternatively be set as a value by which the driver may exceed the posted speed limit, or the assigned speed limit for the particular road classification (e.g. highway, dirt road). The VDM 10 accessing base speed limit information from a mapping database, for example the mapping database of navigation system 30 and/or other database accessible via network 12, may be referred to as dynamic overspeed determination. The VDM 10 may be configured to measure a duration for which a particular overspeed condition has been observed, and may also be configured to accept a particular overspeed duration setting.

When the vehicle 101 is operated in the overspeed range, the VDM 10 may cause an audible growl to be emitted. If the overspeed time exceeds the duration setting, the VDM 10 may change the audible growl to an audible violation tone, and may continue the tone until the vehicle 101 speed drops below the overspeed setting, according to embodiments of the present disclosure.

When the vehicle 101 is operated in the high overspeed range, the VDM 10 may be configured to cause a tone at a higher frequency, for example without any duration setting or grace period. The tone may continue until the speed drops below the high overspeed setting, but may remain toning at a lower frequency if the vehicle is still in an overspeed condition, according to embodiments of the present disclosure.

According to some embodiments of the present disclosure, the VDM 10 may be configured to provide a voice message and/or video message to indicate to the driver an overspeed, high overspeed, and/or grace period condition. According to some embodiments, speed settings may be configurable based on driver identification. For example, new drivers, inexperienced drivers, or drivers who are new to the particular vehicle 101, may have lower configured overspeed settings than more experienced drivers.

The VDM 10 may provide alerts to the driver for other conditions, for example, an indication that the vehicle 101 is in motion with the parking brake on. The VDM 10 may also include an audio output port to interface with other OEM and/or aftermarket audio systems, for example Firecom® communications systems. According to some embodiments of the present disclosure, the VDM 10 may be configured to provide seatbelt status information via the video display device 40. The VDM 10 may also be configured to provide a visual force indicator via the video display device 40; for example, the VDM 10 may use colors and/or shapes to express a magnitude of overforce and/or overspeed violations (e.g. red for high overforce, yellow for low overforce, and green for no violation). A visual force indicator may also be used that is not part of a video display device 40; for example, an LED panel may progressively light up additional LEDs as the force gets higher, and may change color to the overforce or high overforce conditions, or overspeed and high overspeed conditions.

The VDM 10 may also perform other roles, for example providing a voice message via video display device 40 if it determines that the vehicle 101 has been idling for an excess (e.g. user-defined) period of time. This may be detected by the VDM 10 receiving a signal that the ignition 526 is active, while receiving a zero speed signal from the speed sensor 24 for the particular period of time.

The VDM 10 may also be communicably coupled to one or more panic buttons, which activate an alarm when pushed or activated. Such buttons may be configured to notify the VDM 10 to activate the light system 36, sirens 514, emergency lights 504, lighting system 532, and/or other systems, according to embodiments of the present disclosure. The VDM 10 may also be configured to provide voice messaging and/or video messaging to the crew to alert the crew to a potential maintenance concern with the vehicle 101 based on signals from the internal on board diagnostics system 20, for example low oil pressure, high coolant temperature, high brake temperature, check engine signal, and the like. The VDM 10 may also be configured to monitor maintenance-related info, both with respect to time and over time, such as distances driven, active engine time, and engine distance.

The VDM 10 may also be configured to provide user-defined voice messages and/or video messages for user defined events that are not related to vehicle operation, for example a reminder to gather all equipment following an EMS response. The VDM 10 may also be configured to provide driver notification, as well as log in the vehicle record, other types of driving violations. For example, the VDM 10 may be communicably coupled to a proximity sensor at the front and/or rear of the vehicle 101, and may be configured to monitor whether the vehicle 101 is too close to a vehicle in front (e.g. "tailgating") or a vehicle behind. The VDM 10 may be communicably coupled with a vibration sensor or other sensor capable of determining whether the vehicle 101 is veering or committing lane departure, and warn the driver and log the condition accordingly. The vibration sensor may be used, for example, to determine whether one or more of the wheels is driving over the shoulder warning track.

According to some embodiments of the present disclosure, the VDM 10 permits real time voice over IP messaging, for example via network 12. The driver 112 may communicate with a dispatcher 124 with back-and-forth voice communications via VDM 10, which may include both live voice communications and/or prerecorded and prompted (either automatically or manually) voice messages. Such audio communication may be accomplished via audio device 42, and/or via the sound system or radio 510 of the vehicle 101, according to embodiments of the present disclosure.

With its communicable coupling to network 12, the VDM 10 may also be configured to provide both local (LAN) and remote (WAN) communications of data, including ad hoc requests for the vehicle data record or portions thereof, as well as continuous streaming or real-time communication of vehicle record data. The VDM 10 may permit a user to download and upload data via an existing Wi-Fi network, for example by including a Wi-Fi card as part of the VDM 10, according to embodiments of the present disclosure. The VDM 10 may also permit a user to download and upload data via cellular connection to a cellular data modem or air card; according to some embodiments of the present disclosure, the VDM 10 utilizes and manages cellular communications through its own cellular "dongle" and/or SIM card. This functionality may be accomplished, for example, by using a wireless EMS communications interface device with the VDM 10, for example those described in Patent Cooperation Treaty Application Serial No. PCT/US11/31868, filed on Apr. 9, 2011, which is incorporated by reference herein in its entirety for all purposes.

According to embodiments of the present disclosure, the VDM 10 may interface with, and/or be communicably coupled with, multiple device and applications for the purpose of sharing data, for example via Ethernet and Wi-Fi connections. For example, the VDM 10 may interface with the navigation system 30 as described above to obtain road segment information in order to set dynamic overspeed conditions. The VDM 10 may alternatively carry mapping information internally, to enable dynamic overspeed determinations. In some cases, the mapping information stored on VDM 10 may be periodically updated via network 12. The VDM 10 may also be configured to determine and/or note in the vehicle record whether the vehicle 101 is within a school zone, according to embodiments of the present disclosure.

The VDM 10 may also be configured to provide data to other applications, for example an EMS data management suite, for example ZOLL RescueNet®. This may be done by cellular connection, for example, or by 900 MHz radio which may communicate through a serial connection, to download and upload data. The VDM 10 may serve as a Wi-Fi hotspot, enabling other applications to utilize the VDM's cellular or other connectivity; the VDM 10 may also communicate with other devices via Bluetooth®.

According to some embodiments of the present disclosure, a user (for example a dispatcher) may connect to the VDM 10 via Wi-Fi, cellular, and/or USB hard wire and view the status and values of all (or any subset of specified) monitored and controlled vehicle and driver activities in real time. The VDM 10 may continue to monitor and control notifications even during communications, including downloading and uploading of vehicle record data. The VDM 10 may communicate with the vehicle computer (for example using OBDII and J protocols), and may send requests for data to the vehicle computer system 20, according to embodiments of the present disclosure. The VDM 10 may be configured to communicate with vehicle computer systems 20 made according to the standards in various international markets, including the United Kingdom, Europe, South America, US, and elsewhere. The VDM 10 may also be user configurable to prioritize and schedule Wi-Fi and cellular communications, so as to minimize the impact to cellular bandwidth. For example, the VDM 10 may be configured to communicate via network 12 during non-peak cellular usage hours.

The VDM 10 may also be configured to enhance a user's experience when interacting with the system 100. For example, the VDM 10 software may be written to an enterprise data store, for example data store 130. Back-end database 130 may store such data about the vehicle record from VDM 10, and such data may be accessed with a certain set of services, for example proprietary or open web services, according to embodiments of the present disclosure. protocols, in order to provide a web application accessible from enterprise workstation 122, personal computers, smart phones, iPads®, and other devices with internet connectivity, via encrypted secured connections. The application software for accessing the VDM 10 data may reside on the end user's server and/or a server hosted by the VDM 10 manufacturer, according to embodiments of the present disclosure. The system administrator 134 for system 100 may control the quantity and the specified serial numbers (or other unique identification numbers) of the VDM 10 devices supported by the application. The system administrator 134, via the enterprise environment 103, may also control the number of drivers that the system will support. For example, the enterprise user 124 may obtain from the system administrator 134 the rights to have the data from up to five VDM 10 devices accessed via enterprise workstation 122. If the enterprise user wanted to add a sixth VDM 10 to the web interface system, the enterprise user would need to obtain activation from the system administrator 134, according to embodiments of the present disclosure.

The enterprise environment 103, including enterprise application server 128 and enterprise storage server 126, may be configured to enable and disable specific functions within the application program, and set time parameters for the expiration of specific functions or operability. The application program may be password protected, enabling users to assign specific access and control levels to various multiple users. The system administrator 134 may be given an override and/or "back door" access to the application program in the enterprise application server 128, for example. For example, if the VDM 10, or the enterprise user 124, discovers that the vehicle 101 associated with the VDM 10 has been stolen, the enterprise user 124 may remotely disable the vehicle, for example by sending a command via VDM 10 to end the engine ignition 526, according to embodiments of the present disclosure. The VDM 10 may be configured with a battery power source, and upon receiving an indication of having been stolen or lost, the VDM 10 may continue to power itself and the GPS 32, so as to permit location of the stolen or lost vehicle 101 using VDM 10, according to embodiments of the present disclosure.

The enterprise environment 103 may be configured to store some of all of the vehicle data record, including both driver safety and medical/patient encounter information, for all vehicles and all encounters, according to embodiments of the present disclosure. The enterprise storage server 126 and/or enterprise application server 128, which may be a single server or separate servers, may be configured to permit access to the vehicle record data, to permit report generation based on a number of different user selectable factors, including time, vehicle ID, driver ID, and other factors.

Report generation may be accomplished on a periodic (e.g. daily, weekly, monthly) basis, and/or may be done on an ad hoc basis by an enterprise workstation 122 accessing the enterprise application server 128. Reports may be accessible and/or delivered in an electronic format, for example a spreadsheet format. Report generation may be password protected, and access to all reporting data may be limited to an individual, a specified group of individuals, or all individuals (e.g. full access), according to embodiments of the present disclosure. Access to specific reports, for example vehicle maintenance reports, may be controlled, according to embodiments of the present disclosure.

The reports accessible via enterprise application server 128 may include some of all of the data collected by the VDM 10, for some of all of the VDMs 10 in the particular fleet or the particular system 100. The enterprise user 124 may establish a profile and/or set various configuration settings, which may be stored on the enterprise application server 128 and/or the enterprise workstation 122. The reports generated may access the profile and/or configuration settings to determine which data to display, and how to display it. For example, the reporting module may be configurable to show or toggle between US customary and metric values for measurements. Most report generation may be accessed from a single, user-friendly query screen displayed on enterprise workstation 122, according to embodiments of the present disclosure. To simplify the menu and the screen, some of the selection defaults or drop-down menus may be displayed and selected on a sub-screen or other configuration screen, according to embodiments of the present disclosure.

The VDM 10 may send e-mails to user-designated e-mail addresses when a user-defined alert incident occurs. The VDM 10 may also send an alert and alarm if a driver panic button (or crew panic button) is activated. According to some embodiments of the present disclosure, the VDM 10 is communicably coupled to multiple panic buttons within the vehicle 101. The VDM 10 may also provide an e-mail alert, or other message, to an enterprise workstation 122, in the event of an air bag deployment and/or excess observed acceleration value. The VDM 10 may also be configured to provide an alert upon a sudden loss of fuel and/or movement detected by the accelerometer 16 when the engine is off (as sensed by the ignition sensor 526), according to embodiments of the present disclosure.

A user 124 of a web application interface (e.g. via workstation 122) may, when an alert is received, be provided with an option to display a list of all vehicles and a status of all alert parameters. In some cases, the user may activate a "hot key" or other override function in order to obtain an image displayed on a map indicating the vehicle location when the alert occurs. The web application interface permits the user to specify that the alert notifications should override and/or overlay and/or replace any other display currently displayed on the screen, according to embodiments of the present disclosure. The web application may also permit the user to select a "hot key" or the like to receive a video image, for example a streaming live image, from the vehicle 101 when an alert occurs. According to other embodiments of the present disclosure, the web application may receive an alert when the vehicle 101 drives out of radio frequency (e.g. Wi-Fi) range of a particular piece of equipment, for example a defibrillator with Wi-Fi or other radio frequency capability, according to embodiments of the present disclosure.

As discussed above, the VDM 10 may be communicably coupled to a navigation system 30; alternatively, the VDM 10 hardware enclosure or housing may itself incorporate a global positioning system. The VDM 10 may incorporate directional (for example magnetometer) technology, either integral or indirectly via navigation system 30. The VDM 10 may provide mapping capability, so that remote users 124 of a web application interface may see mapping features, for example current location of the vehicle 101 with respect to surrounding streets and/or landmarks, as well as the location of the vehicle 101 as particular moments in time, including future or predicted locations, in a visual map display, according to embodiments of the present disclosure.

The VDM 10 may also be configured to activate or deactivate vehicle devices upon receiving a remote command, for example through network 12, using a twelve-volt digital output, according to embodiments of the present disclosure. The VDM 10 may also be configured to activate or control OEM systems and devices with a remote command from the application software (e.g. the application software hosted by enterprise server 128 and accessed via workstation 122) to the vehicle data bus 20, for example using ODBII and/or J protocols, according to embodiments of the present disclosure. The VDM 10 may also activate or deactivate vehicle devices using a five volt digital output. The VDM 10 may also activate and/or deactivate devices located within the vehicle 101 based on user-defined parameters, using a twelve or five-volt digital output, according to embodiments of the present disclosure. This may similarly be accomplished using the vehicle data bus 20. The application software may also turn off driver feedback messaging and/or tones with a remote command, according to embodiments of the present disclosure. For example, if the VDM 10 sends an alarm to the remote web application interface indicating that a smoke detector 23 has detected smoke in the front cabin 150, the application software may display the smoke alarm to web interface user 124. The web user 124 may access a live video stream, and observe that the driver 112 is smoking a cigarette. The web user 124 may turn off the smoke alarm, and send the driver 112 a voice and/or video message instructing and/or reminding the driver 112 that smoking is not permitted, according to embodiments of the present disclosure.

According to some embodiments of the present disclosure, the user, for example a vehicle fleet manager, may set monitoring, audible feedback, violation, grading, and reporting parameters for individual vehicles, groups of vehicles, and/or an entire fleet. Alternative parameters may be specified for situations during which the vehicles 101 are operating in emergency mode, and/or for different identified drivers.

The enterprise application server 128 may also be configured to track the particular data and/or types of reports accessed by a particular enterprise user 124 and/or a subscribing organization (e.g. a particular county's fire department), and suggest to the user 124 one or more other reports that are similar, or which similarly-acting users often access. The server 128 may be configured to identify trends in data usage, and/or in the data itself, and displays such trends in textual and/or graphical format. The server 128 may also be configured to display suggestions or recommendations based on trends. For example, if server 128 notices a relatively high number of backing violations, the server 128 may include a graphical button that, when activated on the user's 124 workstation 122, automatically activates a voice message for play by each VDM 10 in the fleet on vehicle ignition, that says "please remember to use a spotter when backing."

The VDM 10 may also be configured to provide a reward and/or incentive system for drivers 112 or crew members 114, according to embodiments of the present disclosure. For example, when a driver 112 logs in to a particular VDM 10 via crew ID device 14, and the VDM 10 queries database 130 and determines that the driver 112 has a driving safety score that exceeds a user-defined threshold, the VDM 10 may activate the sound system or radio device 510 for entertainment between runs, may activate a seat warmer system, an air conditioning or heating system, or other entertainment or luxury items that are normally optional, but which may be activated as a reward for safe driving. When a driver 112 logs in to the VDM 10, the VDM 10 may display (e.g. via video display device 40 or via a web browser interface when the driver 112 accesses data from a remote workstation 122) a graphic or point reward interface, which may also permit the driver to use points gathered for safe driving scores to redeem prizes or vacation time, according to embodiments of the present disclosure. The VDM 10 may also be configured to activate a Wi-Fi hot spot for internet access, as a reward for certain safety performance, according to embodiments of the present disclosure.

According to embodiments of the present disclosure, a user 124 may be a code reviewer reviewing the vehicle data record, and/or the patient transport record. In such cases, the web application through which the user 124 accesses the vehicle data may permit the user 124 to flag times and/or events which were not previously flagged, for later retrieval and/or for facilitated review. In some cases, the user 124 may be a driver 112 and/or crew member 114, and the web application may authenticate their identity and permit them to review the vehicle data for the runs which they have performed, and/or for the records which involve their performance. According to embodiments of the present disclosure, the web application may permit the driver 112 and/or crew member 114 to insert annotations or flags into the vehicle data record, for example for explanatory purposes. For example, if the VDM 10 added to the vehicle data record an overforce condition, the driver 112 may be able to go back into the record and add a comment or annotation, which may be in the form of a recorded voice message, a text entry, a flag, and/or the like, to explain that the overforce condition was a result of braking to avoid colliding with another driver who was driving unsafely. According to some embodiments of the present disclosure, the enterprise workstation 122 is in the vehicle 101, and the driver 112 and/or crew member 114 may edit and/or comment on the vehicle data record shortly after a particular run or a particular shift, while the events are still fresh in memory. Such edits and/or comments may be added directly to the vehicle data record in VDM 10, and/or added to the remote copy of the vehicle data record stored on database 130, according to embodiments of the present disclosure. The crew member 114 and/or driver 112 may have the ability to delete sections of video under certain circumstances.

According to some embodiments of the present disclosure, the VDM 10 is configured to receive commands via the audio capture device 28, and/or to transcribe narratives received via the audio capture device 28. For example, the driver 112 says "I am going to give a narrative now," and the VDM 10 interprets this as a command to begin voice-recognized transcription and/or to create a sound file (e.g. a ".wav" file) to enter into the vehicle data record the information recorded. According to some embodiments of the present disclosure, the VDM 10 uses both gesture and voice command recognition, for example recording a crew member's narrative while flagging and/or bookmarking the points in time when the crew member makes a certain hand gesture, for example raising his or her hand.

According to some embodiments of the present disclosure, the VDM 10 is configured to build historical data, and/or to feed it back into the VDM's 10 feedback and alert system. For example, if VDM 10 senses an overforce braking event along a particular stretch of road a user-defined number of times, the VDM 10 may automatically adjust the overspeed limit to be lower to ensure that the VDM 10 reminds the driver 112 to slow down going over that stretch of road, in order to avoid additional braking events, according to embodiments of the present disclosure. Such historical data may also be used by VDM 10 to find an effective speed limit for a particular stretch of road, and/or provide a voice alert, according to embodiments of the present disclosure.

The VDM 10 may be configured to store data in a recognized or industry standard data format, for example National EMS Information System (NEMSIS) data format, HL7 format, or XML format, and/or the enterprise storage server 126 may be configured to convert the vehicle record data from database 130 into a NEMSIS data format, according to embodiments of the present disclosure According to some embodiments of the present disclosure, the VDM 10 is configured to gather vehicle data that may be used for fleet maintenance decisions; for example, the reporting feature of enterprise application server 128 may be configured to associate vehicle safety data with maintenance data or decisions, for example activating a maintenance alert to an enterprise user 124 for a particular vehicle 101 earlier if that particular vehicle 101 has experienced more overforce conditions (e.g. heavy braking) than an average vehicle. The VDM 10 may also be configured to predict in-field failure, for example if a severe drop in battery charge is detected for the vehicle 101, the VDM 10 may be configured to alert the driver 112 and/or crew 114 that a new destination should be selected and/or a backup plan implemented.

According to some embodiments of the present disclosure, the administration environment 103 collects vehicle data for numerous vehicles owned by multiple different vehicle fleet managers, and the enterprise user 124 is a member of the vehicle manufacturing or insurance industry, who accesses via enterprise workstation 122 some or all of the vehicle data records in order to improve vehicle safety design, and as empirical or "real world" testing data for evaluating vehicle performance over time and under various circumstances. In such cases, any medical or patient or other confidential information may be screened or shielded, but vehicle information may be passed through such a connection in order to permit the user 124 to see historical maintenance and vehicle performance data for one particular vehicle or any number of vehicles over a particular period of time. Such reports may be interactively customized, permitting the user 124 to select the particular field and time frames to view, according to embodiments of the present disclosure. The web data interface for manufacturing and insurance industry participants may be customized to permit access to data fields that are of particular interest to those industries, for example accelerometer-based information, seatbelt data, weight distribution, tire pressure, engine diagnostics, and the like.

According to some embodiments of the present disclosure, the VDM 10 is configured to facilitate compliance with wearing hearing protection in situations in which hearing protection is required, by requiring a user confirmation that hearing protection is secured, and/or by processing video imagery to determine whether a user is wearing earmuffs, for example. The VDM 10 may also be configured to perform active noise cancellation, for example on siren sounds received through audio capture device 28, according to embodiments of the present disclosure. The VDM 10 may also be communicably coupled to a third party headset and/or dispatch system, for example the FireCom™ system, and may be configured to enter into the vehicle data record audio recordings from other channels and/or users (e.g. record in an ambulance VDM 10 audio communications from firefighters who have also responded to the same emergency). The VDM 10 may be communicably coupled to a variety of audio or other multimedia systems in personal protection gear, such as face masks, gloves, hazardous material suits, and/or helmets, according to embodiments of the present disclosure.

Figure 6:
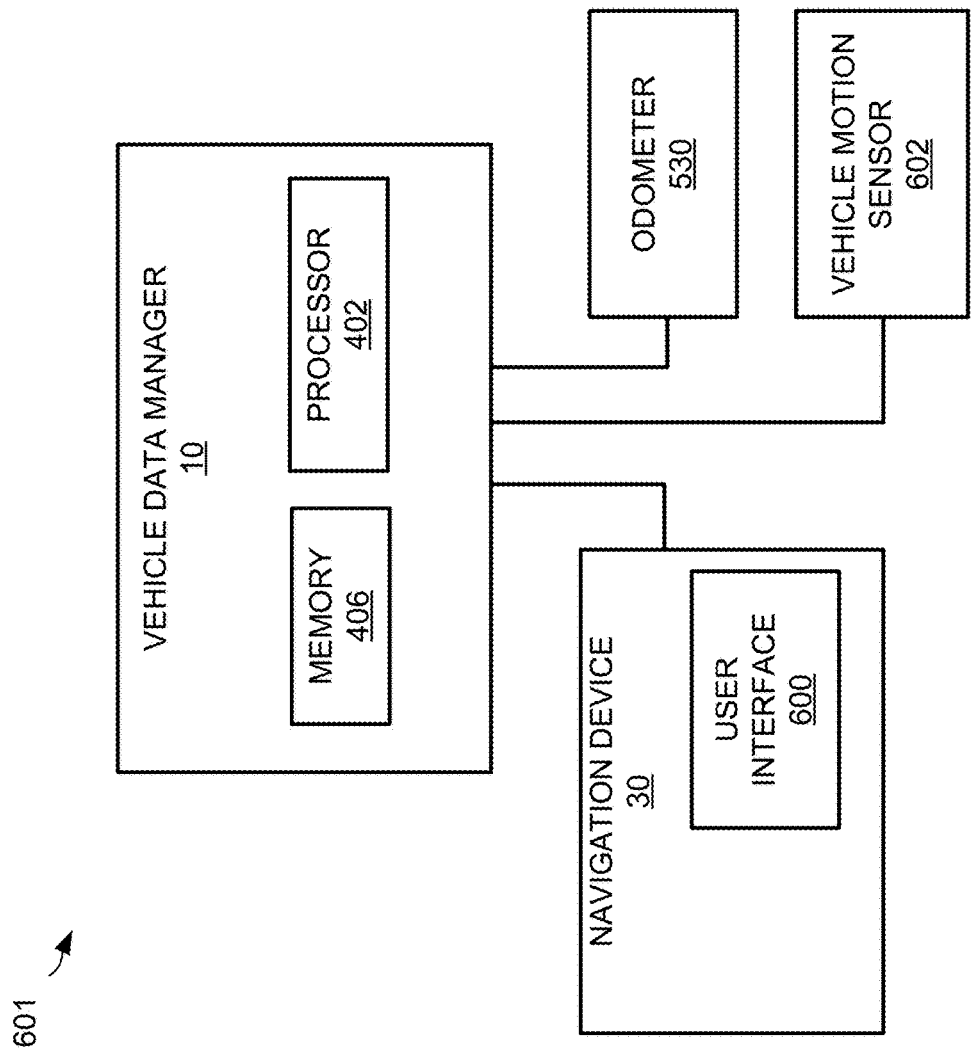
FIG. 6 illustrates a response mode verification system, according to embodiments of the present disclosure.

FIG. 6 illustrates a system 601 for response mode verification, according to embodiments of the present disclosure. The system 601 includes a vehicle data manager 10, which may include a memory 406 and a processor 402. The system 601 further includes a navigation device 30, which may include a user interface 600. The system 601 may further include an odometer 530, and/or a vehicle motion sensor 602. The vehicle data manager 10 may be communicably coupled to the navigation device 30, the odometer 530, and/or the vehicle motion sensor 602. In some embodiments, some or all of the VDM 10 is part of the navigation device 30, and the odometer 530 and/or vehicle motion sensor 602 are communicably coupled with navigation device 30. In other embodiments, a navigation device 30 may include a processor 402 and/or memory 406, and an odometer 530 and/or vehicle motion sensor 602 may be communicably coupled with the navigation device 30. In some embodiments, the processor 402 and/or memory 406, and their functions and features described herein, are housed in or handled by another device, or a combination of devices.

The vehicle motion sensor 602 may be located in a vehicle, for example in vehicle 101, according to embodiments of the present disclosure. Processor 402 may be communicably coupled to the user interface device 600, the vehicle motion sensor 602, and the memory 406, and the memory 406 may include instructions that, when executed by the processor 402, cause the processor to: receive a dispatch request, receive a first indication from the user interface device 600 based on a user indicating acceptance of the dispatch request, record an acceptance time of the first indication, receive a second indication from the vehicle motion sensor 602 based on the vehicle motion sensor 602 monitoring a change in movement of the vehicle 101, record a vehicle motion time of the second indication, generating a notification indicating that a difference between the vehicle motion time and the acceptance time exceeds a threshold time. According to some embodiments, the threshold time is zero, which may be a default causing the response mode verification notification feature to be turned off or deactivated. When a user (e.g., an administrator) assigns a period of time to the threshold time, the response mode verification notification feature may be activated. If the vehicle begins moving within a period of time after the user selects the response button, then no notification is sent, indicating a timely response. This threshold time period may be set by the user, by the crew, by the supervisor(s) of the user or the crew, and/or by the dispatcher or supervisor(s) of the dispatcher. This threshold time period may be set on a customer-level, and/or set for an entire fleet of response vehicles. In some cases, the vehicles 101 with which embodiments of the present disclosure are used are ambulances, police cars, fire trucks, taxis, emergency response vehicles, helicopters, motorcycles, boats, and/or other dispatched vehicles. In some cases, the threshold time is 60 seconds or less; in other cases, the threshold time is two minutes or less; in other cases, the threshold time is three minutes or less; in other cases, the threshold time is five minutes or less; in other cases the threshold time is ten minutes or less. The threshold time may be any period of time, according to embodiments of the present disclosure.

The user indicates acceptance of a dispatch request by selecting a response button 702 on the user interface 600, for example as illustrated in FIG. 7. In some cases, the respond button 702 is a physical button, in other cases, the respond button 702 is a soft key or soft button. In some cases, the respond button 702 is an "easy response" button as shown and/or described in U.S. Patent Application Publication No. 2013/0124090, published on May 16, 2013, the contents of which are hereby incorporated by reference herein for all purposes.

In some cases, the user interface device 600 and/or navigation device 30, the memory 406, and the processor 402 are located within the vehicle 101. According to some embodiments, the vehicle motion sensor 602 is a global positioning system device comprised by the vehicle 101. According to some embodiments, the vehicle motion sensor 602 is communicably coupled with a control system and/or internal/OEM vehicle system and/or on board diagnostic system of the vehicle. This results in the vehicle data manager 10 getting accurate information about whether the vehicle is moving. According to some embodiments, all or part of the components shown in FIG. 6 may be part of the same device, different devices, and/or distributed across multiple devices, and/or such components may be communicably coupled directly or indirectly with one another. As such, while a VDM 10 is shown for illustrative purposes, in some embodiments the memory 406 and processor 402 are part of navigation device 30, and the odometer 530 and vehicle motion sensor 602 are communicably coupled with navigation device 30, and navigation device 30 performs the functions and has the features described herein with respect to VDM 10. Other devices or systems may be configured similarly, and/or to perform similar functions, according to some embodiments of the present disclosure.

In some cases, the vehicle motion sensor 602 senses and/or determines whether a stationary vehicle begins moving, and/or whether a moving vehicle changes its movement. This may be accomplished, for example, by noting that one or more wheels is rotating (e.g. with rotation/speed sensor 24), noting that the throttle position (e.g. 538) (and/or gas pedal position) has changed, noting an acceleration change (e.g. via accelerometer 16), noting a speed change, noting a steering wheel change, noting a course adjustment with a GPS device, noting an ignition activation (e.g. via ignition system 526). Other methods or mechanism may be used for this purpose, as well as a combination or subcombination of two or more of these and/or subfeatures thereof, according to embodiments of the present disclosure. In some cases, the vehicle motion sensor 602 is configured to generate the second indication only when at least one of (or, alternatively, when both of) the following two conditions is met: the vehicle 101 exceeds a threshold speed and the vehicle 101 exceeds a threshold distance traveled. When the vehicle motion sensor 602 detects movement of the vehicle 101 by determining whether the vehicle 101 has traveled a certain distance, the vehicle motion sensor 602 may be configured to determine whether the vehicle 101 has moved a distance that exceeds a certain distance threshold. For example, the distance threshold may be five meters or less, in order to account for potential jitter and/or movement over a trivial or insubstantial distance that does not legitimately indicate that a response has been commenced. Such a threshold distance may alternatively be ten meters or less, fifteen meters or less, twenty meters or less, or any other distance threshold, according to embodiments.

In some cases, the dispatch request originates with a dispatcher, and wherein generating the notification further includes sending the notification to the dispatcher. The notification may be made in the form of sending an electronic mail message, including without limitation a text message, an e-mail, an alarm, a visual alert, and/or the like. In some cases, the vehicle is operated by a crew, and generating the notification further includes sending the notification to a supervisor of the crew when the supervisor is not in the vehicle. The notifications may be sent to a general server for dissemination to CAD workstations and/or may be sent as emails to selected recipients.

According to some embodiments, if the processor 402 determines that a time threshold has been exceeded between a dispatch request acceptance and/or response notification and the vehicle being in motion, the processor 402 may be configured to notify the dispatcher (e.g. dispatcher 124 at dispatch workstation 122—see FIG. 1). In some cases, the dispatch system 122 may be configured to redirect the dispatch request to a different vehicle upon receiving the notification, and/or to notify the first vehicle that, due to its response time being verified as outside of the threshold time, the dispatch request has been redirected to another vehicle or vehicle crew. In some cases, such redirection may occur automatically. In some cases, the time threshold exceeding a first minimum threshold value results in the dispatcher and/or a supervisor following up directly with the original or first vehicle to inquire about the response time delay, while the time threshold value exceeding a second threshold value greater than the first minimum threshold value results in the dispatch request being redirected or automatically redirected or redirected upon confirmation by the dispatcher.

A system 601 for odometer time stamp recordal according to embodiments of the present disclosure may include a user interface device 600, such as that which may be part of a navigation device 30. The system 601 may further include an odometer 530; in some cases, the odometer 530 is located in a vehicle 101. The system 601 may further include a memory 406, as well as a processor 402 communicably coupled to the user interface device 600, the odometer 530, and the memory 406, the memory 406 including instructions that, when executed by the processor 402, cause the processor 402 to: receive an indication from the user interface device 600 based on a user indicating occurrence of an event, record an occurrence time of the indication, receive an odometer reading from the odometer 530, and record the odometer reading at the occurrence time in association with the event. According to some embodiments, the event is one of the following: the vehicle is enroute to a location of a medical emergency, the vehicle has arrived at the location of the medical emergency, and the vehicle is transporting a patient to a medical care facility.

In some cases, the indication is a first indication, the event is a first event, the occurrence time is a first occurrence time, and the memory 406 further includes instructions that, when executed by the processor, further cause the processor to: receive a second indication from the user interface device 600 based on the user indicating occurrence of a second event, recording a second occurrence time of the second indication, and recording the odometer reading at the second occurrence time in association with the second event. According to some embodiments, the first event is one of the following and the second event is a different one of the following: the vehicle is enroute to a location of a medical emergency, the vehicle has arrived at the location of the medical emergency, and the vehicle is transporting a patient to a medical care facility.

According to some embodiments, the user indicating occurrence of the event comprises the user selecting a timestamp button 704 on the user interface device 600, as illustrated in FIG. 7. The timestamp button 704 may be a soft button/soft key, and/or a physical button. Separate buttons 704 may exist for each time stamp and/or event; alternatively, the same button 704 may have its content updated to reflect the next event in the dispatch process. When a user presses the button 704, the system 10 makes a note or flag or recordal of both the time when the button is pressed, the odometer 530 reading at that time, and the type of event indicated.

Some dispatch-related vehicle activities are billed to users, for example to collect mileage reimbursements from patents and/or government welfare agencies for the transport of patients via ambulance. Embodiments as described above permit more accurate collection and recording of mileage data associated with a vehicle dispatch, for example a patient transport in an emergency medical response. According to some embodiments of the present disclosure, such mileage data associated with events is stored in the vehicle data management system and uploaded to servers after the dispatch or transport activity. In certain embodiments, when a user selects a timestamp, a road safety box is queried for the current odometer to pass along with the timestamp to the server. This data may then be disseminated to CAD workstations.

Figure 8:
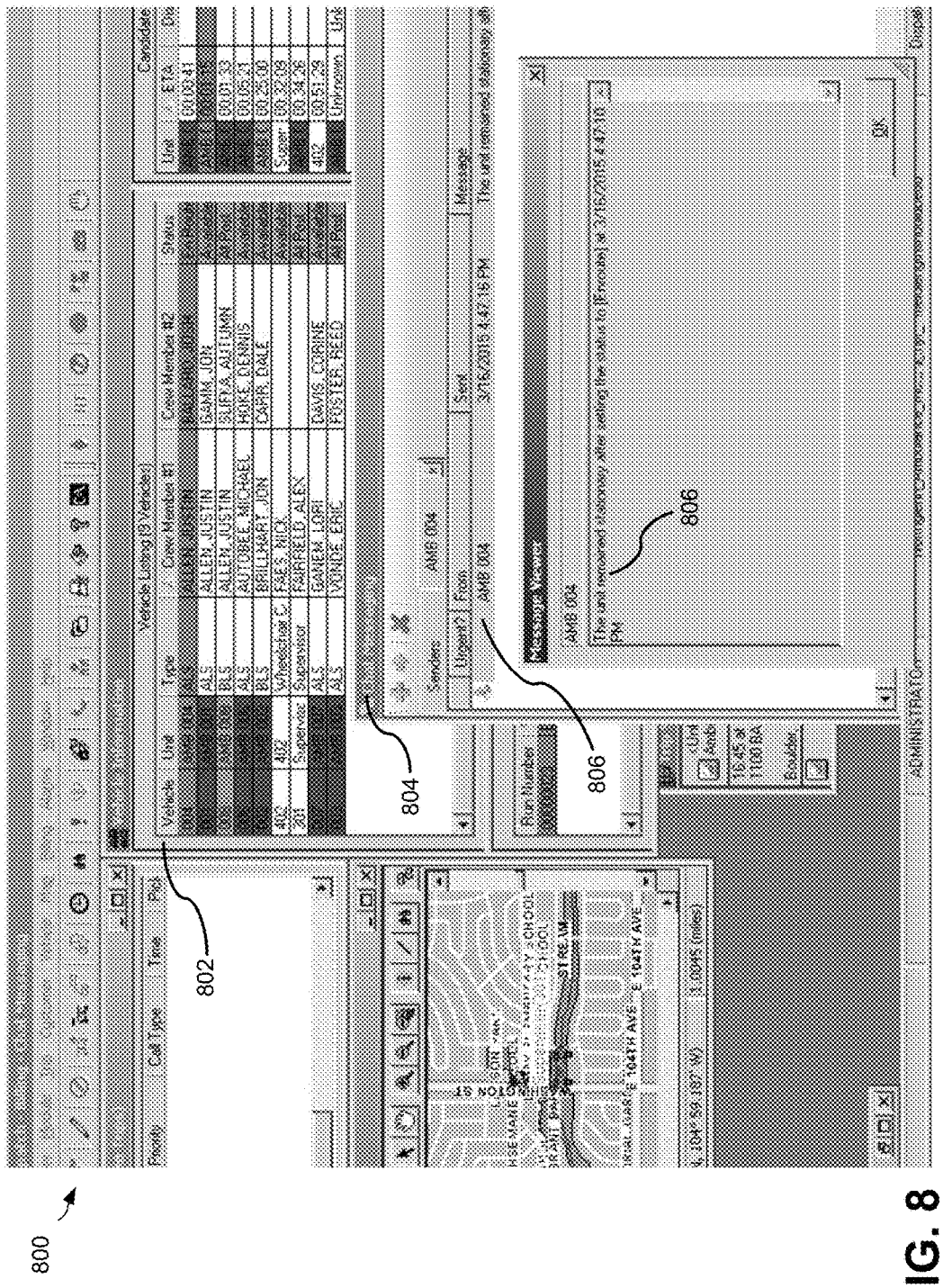
FIG. 8 illustrates a screen shot from a dispatch user interface showing a notification message, according to embodiments of the present disclosure.

FIG. 8 illustrates a screen shot from a dispatch user interface showing a notification message, according to embodiments of the present disclosure. Within a dispatch and/or billing program user interface window 800, various other windows or user interface components indicate information about the vehicle dispatch process. A vehicle information window 802 provides details about vehicle numbers, unit numbers, types of vehicles (advanced life support—ALS vs. basic life support—BLS vs. wheelchair and/or supervisor vehicles). The vehicle information window 802 also provides information about crew members, and status of the vehicles. As shown at the top row of window 802, vehicle AMB 004 is "En Route" meaning that a crew member has indicated via the user interface 600 that the vehicle is in the process of moving toward its destination. However, the processor 402 in this case determined that the time between the "en route" indication and the actual vehicle movement (also referred to as the "wheels rolling" determination) exceeded a threshold time. The processor then caused a chat messaging window 804 to be invoked, with a message 806 indicating the unit identification (ABM 004) and informing the user, who may be a supervisory and/or dispatch personnel, that the "unit remained stationary after setting the status to [Enroute] at" the indicated time. While one type of message is shown, other types and combinations of messages are possible, including without limitation a text message or phone message to a mobile device, and an e-mail message.

In certain embodiments, the systems, methods and processes described herein may be implemented on hardware and/or software, e.g., cloud-based or in-premise.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A system for response mode verification, the system comprising:
 a user interface device;
 a vehicle motion sensor located in a vehicle;
 a memory; and
 a processor communicably coupled to the user interface device, the vehicle motion sensor, and the memory, the memory including instructions that, when executed by the processor, cause the processor to:
  receive a dispatch request,
  receive a first indication from the user interface device based on a user indicating acceptance of the dispatch request,
  record an acceptance time of the first indication,
  receive a second indication from the vehicle motion sensor based on the vehicle motion sensor monitoring a change in movement of the vehicle, and
  record a vehicle motion time of the second indication,
  generate a notification indicating that a difference between the vehicle motion time and the acceptance time exceeds a threshold time.

2. The system of claim 1, wherein the user interface device, the memory, and the processor are located within the vehicle.

3. The system of claim 1, wherein the vehicle motion sensor is a global positioning system device comprised by the vehicle.

4. The system of claim 1, wherein the vehicle motion sensor is communicably coupled with a control system of the vehicle.

5. The system of claim 1, wherein the vehicle motion sensor is configured to generate the second indication only when at least one of the following two conditions is met: the vehicle exceeds a threshold speed and the vehicle exceeds a threshold distance traveled.

6. The system of claim 5, wherein the vehicle motion sensor is configured to generate the second indication only when both of the two conditions are met.

7. The system of claim 1, wherein the dispatch request originates with a dispatcher, and wherein generating the notification further comprises sending the notification to the dispatcher.

8. The system of claim 1, wherein generating the notification further comprises sending an electronic mail message.

9. The system of claim 1, wherein the vehicle is operated by a crew, and wherein generating the notification further comprises sending the notification to a supervisor of the crew when the supervisor is not in the vehicle.

10. A method for response mode verification, the method comprising:
receiving a dispatch request;
receiving a first indication from a user interface device based on a user indicating acceptance of the dispatch request;
recording an acceptance time of the first indication;
receiving a second indication from a vehicle motion sensor based on the vehicle motion sensor monitoring a change in movement of a vehicle;
recording a vehicle motion time of the second indication; and
generating a notification indicating that a difference between the vehicle motion time and the acceptance time exceeds a threshold time.

11. The method of claim 10, wherein the user interface device, a memory, and a processor are located within the vehicle.

12. The method of claim 10, wherein the vehicle motion sensor is a global positioning system device comprised by the vehicle.

13. The method of claim 10, wherein the vehicle motion sensor is communicably coupled with a control system of the vehicle.

14. The method of claim 10, further comprising generating the second indication with the vehicle motion sensor only when at least one of the following two conditions is met: the vehicle exceeds a threshold speed and the vehicle exceeds a threshold distance traveled.

15. The method of claim 14, further comprising generating the second indication with the vehicle motion sensor only when both of the two conditions are met.

16. The method of claim 10, wherein receiving the dispatch request comprises receiving the dispatch from a dispatcher, and wherein generating the notification further comprises sending the notification to the dispatcher.

17. The method of claim 10, wherein generating the notification further comprises sending an electronic mail message.

18. The method of claim 10, wherein the vehicle is operated by a crew, and wherein generating the notification further comprises sending the notification to a supervisor of the crew, wherein the supervisor is not in the vehicle.

19. A system for response mode verification, the system comprising:
a memory; and
a processor configured to be communicably coupled to a user interface device, a vehicle motion sensor, and the memory, the memory including instructions that, when executed by the processor, cause the processor to:
receive a dispatch request,
receive a first indication from the user interface device based on a user indicating acceptance of the dispatch request,
record an acceptance time of the first indication,
receive a second indication from the vehicle motion sensor based on the vehicle motion sensor monitoring a change in movement of the vehicle, and
record a vehicle motion time of the second indication,
generate a notification indicating that a difference between the vehicle motion time and the acceptance time exceeds a threshold time.

20. The system of claim 19, further comprising the user interface device, wherein the user interface device, the memory, and the processor are located within a vehicle.

21. The system of claim 19, further comprising the vehicle motion sensor, wherein the vehicle motion sensor is a global positioning system device comprised by the vehicle.

22. The system of claim 19, further comprising the vehicle motion sensor, wherein the vehicle motion sensor is communicably coupled with a control system of a vehicle.

23. The system of claim 19, further comprising the vehicle motion sensor in a vehicle, wherein the vehicle motion sensor is configured to generate the second indication only when at least one of the following two conditions is met: the vehicle exceeds a threshold speed and the vehicle exceeds a threshold distance traveled.

24. The system of claim 23, wherein the vehicle motion sensor is configured to generate the second indication only when both of the two conditions are met.

25. The system of claim 19, wherein the dispatch request originates with a dispatcher, and wherein generating the notification further comprises sending the notification to the dispatcher.

26. The system of claim 19, wherein generating the notification further comprises sending an electronic mail message.

27. The system of claim 19 implemented in a vehicle operated by a crew, wherein generating the notification further comprises sending the notification to a supervisor of the crew when the supervisor is not in the vehicle.

* * * * *